(12) United States Patent
Araki

(10) Patent No.: US 6,987,174 B2
(45) Date of Patent: Jan. 17, 2006

(54) AZO COMPOUND, COLORANT-CONTAINING CURABLE COMPOSITION, COLOR FILTER AND COLOR FILTER PRODUCTION METHOD

(75) Inventor: Katsumi Araki, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 17 days.

(21) Appl. No.: 10/813,622

(22) Filed: Mar. 31, 2004

(65) Prior Publication Data
US 2004/0260075 A1  Dec. 23, 2004

(30) Foreign Application Priority Data
Apr. 1, 2003  (JP)  ............... 2003-097799
Apr. 1, 2003  (JP)  ............... 2003-097800

(51) Int. Cl.
C09B 29/02  (2006.01)
G02B 5/20  (2006.01)
G02F 1/335  (2006.01)

(52) U.S. Cl. ............... 534/862; 524/159; 347/106

(58) Field of Classification Search ............... 534/862; 524/159; 347/106

See application file for complete search history.

(56) References Cited

FOREIGN PATENT DOCUMENTS

| GB | 1252453 | * | 11/1971 |
| JP | 06-184482 A |  | 7/1994 |
| JP | 09-291-241 A |  | 11/1997 |
| PL | 101484 P |  | 3/1979 |

* cited by examiner

Primary Examiner—Fiona T. Powers
(74) Attorney, Agent, or Firm—Sughrue Mion, PLLC

(57) ABSTRACT

The present invention provides an azo compound represented by the following general formula (I) and a colorant-containing curable composition containing a binder and an azo compound represented by the following general formula (I):

General formula (I)

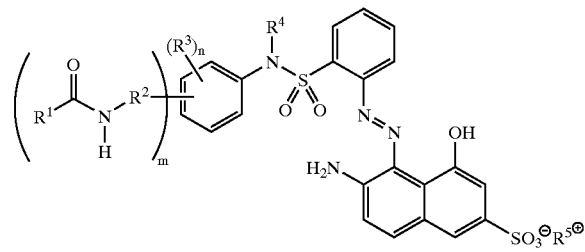

wherein $R^1$ represents a $C_{1-21}$ alkyl, a $C_{1-10}$ perfluoroalkyl, a $C_{2-21}$ alkenyl, a $C_{1-21}$ aryl, a $C_{1-21}$ aralkyl, a $C_{1-21}$ alkylamino, a $C_{1-21}$ aralkylamino, a $C_{1-21}$ arylamino, methacryloylamino, or ethoxycarbonylamino; $R^2$ represents a single bond, —$CH_2$—, —$CH_2CH_2$—, —$CH_2CH_2CH_2$— or —$CH_2CH_2CH_2CH_2$—; $R^3$ represents H, a $C_{1-21}$ alkyl, a halogen, OH, or a $C_{1-21}$ alkoxy; $R^4$ represents a $C_{1-21}$ alkyl, a $C_{2-21}$ alkenyl, a $C_{1-21}$ aryl, a $C_{1-21}$ aralkyl or additionally H in the case of the colorant-containing curable composition; $R^5$ represents H, a metal cation, or a cation of a nitrogen-containing compound; m=1 or 2 (additionally 0 in case of the colorant containing curable composition); and n=0 to 4.

20 Claims, No Drawings

AZO COMPOUND, COLORANT-CONTAINING CURABLE COMPOSITION, COLOR FILTER AND COLOR FILTER PRODUCTION METHOD

CROSS-REFERENCE TO RELATED APPLICATION

This application claims priority under 35 USC 119 from Japanese Patent Application, Nos. 2003-97799 and 2003-97800, the disclosure of which is incorporated by reference herein.

BACKGROUND OF THE INVENTION

1. Field of the Invention

The present invention relates to an innovative azo dye compound, a colorant-containing curable composition suitable for forming color images and composing a color filter to be used for a liquid crystal display device or a solid state image pickup device, as well as a color filter using the colorant-containing curable composition and a production method of the same.

2. Description of the Related Art

In the field of dyes, it has been desired to develop compounds excellent in both light fastness and heat resistance, and investigations on the development thereof have enthusiastically been made. Particularly in the field of dyes that are soluble in solvents or water, compounds excellent in both light fastness and heat resistance have conventionally been desired. With respect to dyes excellent in both light fastness and heat resistance, phthalocyanines type compounds and Cr complexes of azo type dyes, etc. are known. However, since the phthalocyanine type compounds are unsuitable for absorption of visible light with wavelength of 400 to 500 nm, they are not useful for Yellow or Magenta dyes, and moreover, since the phthalocyanine type compounds have high light fastness due to molecular association, there is a problem of storage stability such that dyes are precipitated when dissolved in water or a solvent.

On the other hand, since the Cr complexes of azo type dyes contain a Cr atom, it has been pointed out before that they are harmful to the human body, living things, and the environments, and their improvement has urgently been desired. The azo type dyes are useful dyes which have high color value and are capable of absorbing light at various wavelengths, but non-metal complex type azo type dyes satisfying both high light fastness and heat resistance have not been developed yet.

Among them, compounds having γ-acid as a coupling component (e.g., Acid Red 57) and compounds having pyrazolone (e.g., Acid Yellow 29) have been previously known as azo dyes with relatively good light fastness, but compounds satisfying both high light fastness and heat resistance have not been developed yet (see Polish Patent No. 101,484, German Patent No. 2,714,204, and French Patent No. 2,303,839).

Further, these dyes have another problem in that their heat resistance and light fastness are considerably deteriorated depending on the conditions of use. For example, in cases where the types of fibers to be dyed are changed, where other dye compounds, photopolymerization initiators, polymer compounds, oxidizing agents/reducing agents, or the like coexist with these dyes, where they are used in ozone-generating environments, or where they are used in singlet oxygen-generating environments, at least one of heat resistance and light fastness is deteriorated.

As a method for producing a color filter to be used for a liquid crystal display device or a solid state image pickup device, a dying method, a printing method, an electrodeposition method, and a pigment dispersion method are known.

Among them, the pigment dispersion method is a method for producing a color filter by photolithography from colored radiosensitive compositions obtained by dispersing pigments in a variety of photosensitive compositions. In this method, obtained color filters are stable to light and heat since pigments are used, and they are provided with sufficient positioning precision since patterning is carried out by photolithography. Thus the method is suitable for producing a color filter for a high precision color display with a large size.

To produce such a color filter by the pigment dispersion method, a radiosensitive composition is applied to a substrate by a spin coater or a roll coater and dried to form a film, and the film is exposed to light and developed to obtain color pixels. These steps are repeated an appropriate number of times corresponding to the number of the hues, to obtain a color filter.

For the pigment dispersion method, negative type photosensitive compositions containing photopolymerizable monomers and photopolymerization initiators both together in alkali-soluble resins are disclosed (see, for example, Japanese Patent Application Laid-Open (JP-A) Nos. 2-199403, 4-76062, 5-273411, 6-184482, and 7-140654). However, although further improved precision has recently been desired in a color filter for a solid state image pickup device, the resolution cannot be improved substantially since a pigment exists in the form of particles with a certain size in the case of employing a conventional pigment dispersion method, and also, color irregularities are caused due to bulky particles of the pigment. Thus, such a conventional pigment dispersion method is unsuitable for uses where fine patterns are required, such as in a solid state image pickup device,.

In order to achieve high image resolution, techniques in which dyes are used as the coloring materials have been investigated (see, for example, JP-A No. 6-75375). However, it has been found that a dye-containing curable composition has the following problems.

(1) It is difficult to obtain a liquid state curable composition having a desired spectrum since a conventional dye has a poor solubility in either an aqueous alkaline solution or an organic solvent (hereinafter, simply referred to as solvent in some cases).

(2) It is difficult to adjust the solubility (developing property) of cured parts and non-cured parts since most dyes interac with another component in the curable composition.

(3) A large quantity of a dye has to be added in the case where the molar extinction coefficient($\epsilon$) of the dye is low, and therefore a content of other components such as polymerizable compounds (monomers), a binder, a photopolymerization initiator and the like have to be reduced in the curable composition, resulting in deterioration of the curability and the post-curing heat resistance of the composition and the developing property of (non) cured parts.

(4) Dyes are, in general, inferior in light fastness and heat resistance to pigments.

Unlike in the case of use for producing a semiconductor device, in the case of use for producing a color filter for a solid state image pickup device, a film as thin as 1.5 $\mu$m or thinner is required. Accordingly, the curable composition is required to contain a large quantity of a dye resulting in the above-mentioned problems.

Meanwhile, a red color ink composition for a color filter obtained by dissolving a mono-azo type anionic red color dye in an aqueous amide type organic solvent solution has been disclosed (see, for example, JP-A No. 9-291241). However, the composition is insufficient in light fastness and heat resistance.

As described above, it has been difficult to achieve the performances required for use for high precision color filters particularly for solid state image pickup devices and the like. That is, it has been difficult to achieve sufficient fineness of color patterns, sufficient thinness of films, sufficient durability to light and heat, and sufficient developing property (pattern formability).

SUMMARY OF THE INVENTION

The present invention has been achieved, in consideration of the above-mentioned problems. First, the invention is to provide an azo compound that is excellent in light fastness and heat resistance, as well as insolubility in water and an organic solvent.

Secondly, the invention is to provide a colorant-containing curable composition that has high sensitivity and wide development latitude, is excellent especially in light fastness and heat resistance, as well as in pattern formability (developing property), does not cause elution of a dye after curing, is excellent in solvent resistant, and is capable of forming pattern images (e.g. pixels) with high resolution.

Thirdly the invention is to provide a color filter that is excellent especially in light fastness and heat resistance, as well as in solvent resistance, and has high transmittance, high resolution, and high productivity, from the above-mentioned colorant-containing curable composition.

Fourthly the invention is to provide a color filter production method for producing a color filter which has good pattern formability (developing property) for forming pattern images with good developing property, good hues and high resolution with suppressed elution and mixing (color contamination) of colorants, and which is excellent especially in light fastness and heat resistance as well as in solvent resistance with a high cost performance (high efficiency and high productivity), by using the above-mentioned colorant-containing curable composition. The invention aims to accomplish all of the above-mentioned purposes.

Specific means for solving the above-mentioned purposes are as follows.

<1> A first aspect of the invention is to provide an azo compound represented by the following general formula (I):

General formula (I)

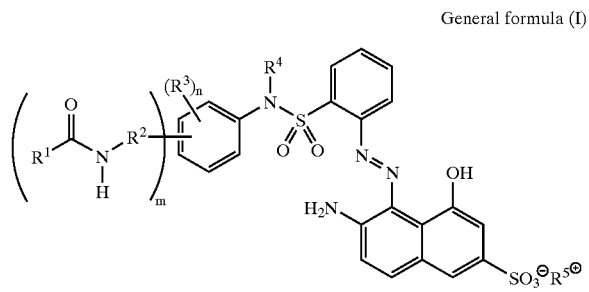

wherein $R^1$ represents a $C_{1-21}$ alkyl, a $C_{1-10}$ perfluoroalkyl, a $C_{2-21}$ alkenyl, a $C_{1-21}$ aryl, a $C_{1-21}$ aralkyl, a $C_{1-21}$ alkylamino, a $C_{1-21}$ aralkylamino, a $C_{1-21}$ arylamino, methacryloylamino, or ethoxycarbonylamino; $R^2$ represents a single bond, $-CH_2-$, $-CH_2CH_2-$, $-CH_2CH_2CH_2-$ or $-CH_2CH_2CH_2CH_2-$; $R^3$ represents hydrogen, a $C_{1-21}$ alkyl, a halogen, a hydroxyl, or a $C_{1-21}$ alkoxy; $R^4$ represents a $C_{1-21}$ alkyl, a $C_{2-21}$ alkenyl, a $C_{1-21}$ aryl, or a $C_{1-21}$ aralkyl; $R^5$ represents hydrogen, a metal cation, or a cation of a nitrogen-containing compound; m denotes an integer of 1 or 2; and n denotes an integer from 0 to 4.

<2> A second aspect of the invention is to provide a colorant-containing curable composition comprising a binder and a colorant, wherein the colorant contains an azo compound represented by the following general formula (I):

General formula (I)

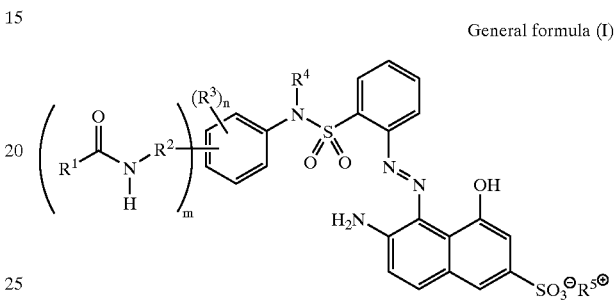

wherein $R^1$ represents a $C_{1-21}$ alkyl, a $C_{1-10}$ perfluoroalkyl, a $C_{2-21}$ alkenyl, a $C_{1-21}$ aryl, a $C_{1-21}$ aralkyl, a $C_{1-21}$ alkylamino, a $C_{1-21}$ aralkylamino, a $C_{1-21}$ arylamino, methacryloylamino, or ethoxycarbonylamino; $R^2$ represents a single bond, $-CH_2-$, $-CH_2CH_2-$, $-CH_2CH_2CH_2-$, or $-CH_2CH_2CH_2CH_2-$; $R^3$ represents hydrogen, a $C_{1-21}$ alkyl, a halogen, a hydroxyl, or a $C_{1-21}$ alkoxy; $R^4$ represents hydrogen, a $C_{1-21}$ alkyl, a $C_{2-21}$ alkenyl, a $C_{1-21}$ aryl, or a $C_{1-21}$ aralkyl; $R^5$ represents hydrogen, a metal cation, or a cation of a nitrogen-containing compound; m denotes an integer from 0 to 2; and n denotes an integer from 0 to 4.

<3> A third aspect of the invention is to provide a color filter comprising a colorant-containing curable composition comprising a binder and a colorant, wherein the colorant contains an azo compound represented by the following general formula (I):

General formula (I)

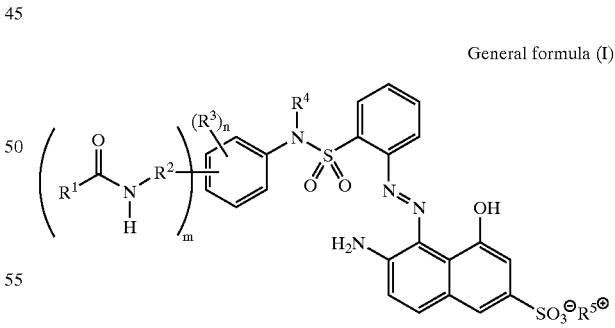

wherein $R^1$ represents a $C_{1-21}$ alkyl, a $C_{1-10}$ perfluoroalkyl, a $C_{2-21}$ alkenyl, a $C_{1-21}$ aryl, a $C_{1-21}$ aralkyl, a $C_{1-21}$ alkylamino, a $C_{1-21}$ aralkylamino, a $C_{1-21}$ arylamino, methacryloylamino, or ethoxycarbonylamino; $R^2$ represents a single bond, $-CH_2-$, $-CH_2CH_2-$, $-CH_2CH_2CH_2-$, or $-CH_2CH_2CH_2CH_2-$; $R^3$ represents hydrogen, a $C_{1-21}$ alkyl, a halogen, a hydroxyl, or a $C_{1-21}$ alkoxy; $R^4$ represents hydrogen, a $C_{1-21}$ alkyl, a $C_{2-21}$ alkenyl, a $C_{1-21}$ aryl, or a $C_{1-21}$ aralkyl; $R^5$ represents hydrogen, a metal cation, or a cation of a nitrogen-containing compound; m denotes an integer from 0 to 2; and n denotes an integer from 0 to 4.

<4> A fourth aspect of the invention is to provide a color filter production method comprising:

providing a colorant-containing curable composition that includes a binder and a colorant, wherein the colorant includes an azo compound represented by the following general formula (I), applying the composition to a support;

exposing the composition through a mask; and developing the exposed composition to form a pattern image, General formula (I)

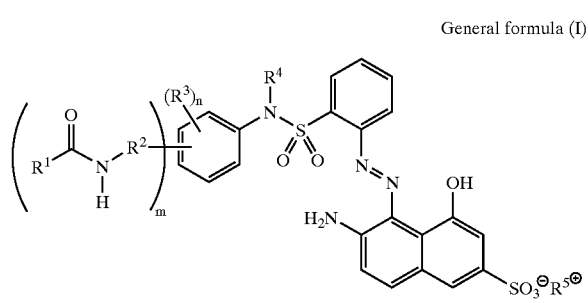

wherein $R^1$ represents a $C_{1-21}$ alkyl, a $C_{1-10}$ perfluoroalkyl, a $C_{2-21}$ alkenyl, a $C_{1-21}$ aryl, a $C_{1-21}$ aralkyl, a $C_{1-21}$ alkylamino, a $C_{1-21}$ aralkylamino, a $C_{1-21}$ arylamino, methacryloylamino, or ethoxycarbonylamino; $R^2$ represents a single bond, —CH$_2$—, —CH$_2$CH$_2$—, —CH$_2$CH$_2$CH$_2$—, or —CH$_2$CH$_2$CH$_2$CH$_2$—; $R^3$ represents hydrogen, a $C_{1-21}$ alkyl, a halogen, a hydroxyl, or a $C_{1-21}$ alkoxy; $R^4$ represents hydrogen, a $C_{1-21}$ alkyl, a $C_{2-21}$ alkenyl, a $C_{1-21}$ aryl, or a $C_{1-21}$ aralkyl; $R^5$ represents hydrogen, a metal cation, or a cation of a nitrogen-containing compound; m denotes an integer from 0 to 2; and n denotes an integer from 0 to 4.

In the above-mentioned color filter production method, in the case of producing a color filter comprising desired hues, the above-mentioned steps are repeated a number of times corresponding to the number of the desired hues. Further, if necessary, the method may preferably comprise a step of curing the pattern image by heating and/or exposure to light.

DETAILED DESCRIPTION OF THE INVENTION

Hereinafter, an azo compound a colorant-containing curable composition, and a method for producing a color filter using the colorant-containing curable composition of the present invention will be described in details.

<Azo Compound and Colorant-containing Curable Composition>

The azo compound of the invention is a dye compound represented by the following general formula (I) and is an innovative dye compound satisfying both of high light fastness and heat resistance and has a good pattern formability (developing property), unlike a conventional azo compound, and if necessary, it can be dissolved in water or an organic solvent.

The colorant-containing curable composition of the invention contains at least a binder and a colorant, and generally contains an organic solvent (solvent). An azo compound represented by the following general formula (I) is contained as a colorant. When a negative-working type structure is to be formed, the colorant-containing curable composition of the invention may contain a photopolymerization initiator and a polymerizable compound together with the binder and the colorant. On the other hand, when a positive-working type structure is to be formed, the colorant-containing curable composition of the invention may contain an o-naphtoquinoneziazide compound. Further, a cross-linking agent and other components may be contained therein. If necessary, when a positive-working type structure is to be formed, a photopolymerization initiator or a polymerizable compound may be further contained.

(Azo Compound Represented by General Formula (I))

General Formula (I)

The azo compound of the invention is a dye compound represented by the following general formula (I).

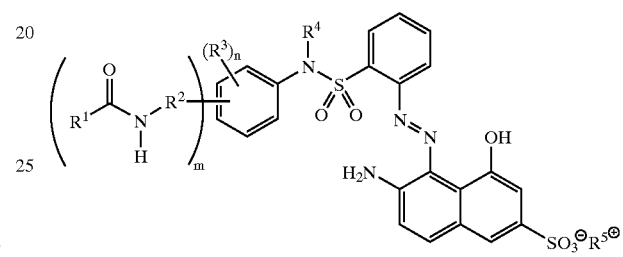

In the above-mentioned general formula (I), $R^1$ represents a $C_{1-21}$ alkyl, a $C_{1-10}$ perfluoroalkyl, a $C_{2-21}$ alkenyl, a $C_{1-21}$ aryl, a $C_{1-21}$ aralkyl, a $C_{1-21}$ alkylamino, a $C_{1-21}$ aralkylamino, a $C_{1-21}$ arylamino, methacryloylamino, or ethoxycarbonylamino.

The $C_{1-21}$ alkyl represented by $R^1$ may have a substituent group. The $C_{1-21}$ alkyl may include straight chain, branched, and cyclic alkyl groups and preferable examples include methyl, ethyl, n-propyl, isopropyl, cyclopropyl, n-butyl, isobutyl, sec-butyl, tert-butyl, cyclobutyl, n-amyl, isoamyl, sec-amyl, tert-amyl, neopentyl, cyclopentyl, n-hexyl, isohexyl, sec-hexyl, tert-hexyl, cyclohexyl, cyclohexylmethyl, cyclopentyl, cyclopropylmethyl, norbornyl, cyclobutylmethyl, bicyclooctyl, straight chain or branched heptyl, cyclopentylethyl, adamantyl, adamantylmethyl, noradamantyl, straight chain or branched octyl, straight chain or branched nonyl, straight chain or branched decyl, straight chain or branched undecyl, straight chain or branched dodecyl, straight chain or branched tridecyl, straight chain or branched tetradecyl, straight chain or branched pentadecyl, straight chain or branched hexadecyl, straight chain or branched heptadecyl, straight chain or branched octadecyl, straight chain or branched nonadecyl, and straight chain or branched eicosanyl.

Among them, more preferable examples include methyl, ethyl, n-propyl, isopropyl, cyclopropyl, n-butyl, isobutyl, sec-butyl, tert-butyl, cyclobutyl, n-amyl, isoamyl, sec-amyl, tert-amyl, neopentyl, cyclopentyl, n-hexyl, isohexyl, sec-hexyl, tert-hexyl, cyclohexyl, cyclohexylmethyl, cyclopentylethyl, cyclopropylmethyl, norbornyl, cyclobutylmethyl, adamantyl, adamantylmethyl, noradamantyl, straight chain or branched heptyl, straight chain or branched octyl, straight chain or branched nonyl, straight chain or branched decyl, straight chain or branched undecyl, and straight chain or branched dodecyl and particularly preferable examples include methyl, ethyl, n-propyl, isopropyl, cyclopropyl, n-butyl, isobutyl, sec-butyl, tert-butyl, cyclobutyl, n-amyl, isoamyl, sec-amyl, tert-amyl, neopentyl, cyclopentyl, n-hexyl, isohexyl, sec-hexyl, tert-hexyl, cyclohexyl, cyclohexylmethyl, cyclopropylmethyl, cyclobutylmethyl, norbonyl, cyclopentylethyl, 2-ethylhexyl, adamantyl, adamantylmethyl, and noradamantyl.

Preferable examples of the $C_{1-10}$ perfluoroalkyl represented by $R^1$ may include trifluoromethyl, pentafluoroethyl, heptafluoropropyl, nonafluorobutyl, tridecafluorohexyl, pentadecafluoroheptyl, heptadecafluorooctyl, nonadecafluorononyl, and the like. Among them, particularly preferable examples are trifluoromethyl, pentafluoroethyl, heptafluoropropyl, nonafluorobutyl, tridecafluorohexyl, and pentadecafluoroheptyl, and particularly preferable examples are trifluoromethyl, pentafluoroethyl, heptafluoropropyl, nonafluorobutyl, and tridecafluorohexyl.

The $C_{2-21}$ alkenyl represented by $R^1$ may have a substituent group. Preferable examples of the $C_{2-21}$ alkenyl optionally having a substituent group include vinyl, isopropenyl, 2-propenyl, 2-methyl-propenyl, 1-methyl-1-propenyl, 1-butenyl, 3-butenyl, 1-methyl-1-butenyl, 1,1-dimethyl-3-butenyl, 1-pentenyl, 2-pentenyl, 1-ethyl-1-pentenyl, 1-hexenyl, 1-heptenyl, 2,6-dimethyl-5-heptenyl, 9-decenyl, 1-cyclopentenyl, 2-cyclopentenylmethyl, cyclohexenyl, 1-methyl-2-cyclohexenyl, and 1,4-dihydro-2-methylphenyl.

Among them, more preferable examples are vinyl, isopropenyl, 2-propenyl, 2-methyl-propenyl, 1-methyl-1-propenyl, 1-butenyl, 3-butenyl, 1-methyl-1-butenyl, 1,1-dimethyl-3-butenyl, 1-pentenyl, 2-pentenyl, 1-ethyl-1-pentenyl, 1-hexenyl, 1-heptenyl, 1-cyclopentenyl, 2-cyclopentenylmethyl, cyclohexenyl, 1-methyl-2-cyclohexenyl, and 1,4-dihydro-2-methylphenyl. Particularly preferable examples are vinyl, isopropenyl, 2-propenyl, 2-methyl-propenyl, 1-methyl-1-propenyl, 1-butenyl, 3-butenyl, 1-methyl-1-butenyl, 1,1-dimethyl-3-butenyl, 1-pentenyl, 2-pentenyl, 1-ethyl-1-pentenyl, 1-hexenyl, 1-cyclopentenyl, 2-cyclopentenylmethyl, cyclohexenyl, 1-methyl-2-cyclohexenyl, and 1,4-dihydro-2-methylphenyl.

The $C_{1-21}$ aryl represented by $R^1$ may have a substituent group. Preferable examples of the $C_{1-21}$ aryl optionally having a substituent group include phenyl, naphthyl, biphenylenyl, acenapthenyl, fluorenyl, anthracenyl, anthraquinonyl, and pyrenyl and among them, more preferable examples are phenyl, naphthyl, biphenylenyl, acenapthenyl, fluorenyl, and anthracenyl, and particularly preferable examples are phenyl, naphthyl, biphenylenyl, and fluorenyl.

The $C_{1-21}$ aralkyl represented by $R^1$ may have a substituent group. Preferable examples of the $C_{1-21}$ aralkyl optionally having a substituent group include benzyl, diphenylmethyl, phenyl-cyclopentylmethyl, α-methylbenzyl, phenylethyl, α-methyl-phenylethyl, β-methyl-phenylethyl, 3-phenylpropyl, 4-phenylbutyl, naphthylmethyl, styryl, cinnamyl, fluorenyl, 1-benzocyclobutenyl, 1,2,3,4-tetrahydronaphthyl and the like.

Among them, more preferable examples are benzyl, phenyl-cyclopentylmethyl, α-methylbenzyl, phenylethyl, α-methyl-phenylethyl, β-methyl-phenylethyl, 3-phenylpropyl, 4-phenylbutyl, styryl, cinnamyl, fluorenyl, 1-benzocyclobutenyl, and 1,2,3,4-tetrahydronaphthyl and particularly preferable examples are benzyl, α-methylbenzyl, phenylethyl, α-methyl-phenylethyl, β-methyl-phenylethyl, 3-phenylpropyl, styryl, cinnamyl, fluorenyl, 1-benzocyclobutenyl, and 1,2,3,4-tetrahydronaphthyl.

The $C_{1-21}$ alkylamino represented by $R^1$ may have a substituent group. The $C_{1-21}$ alkylamino may include straight chain, branched, and cyclic alkylamino groups and preferable examples include methylamino, ethylamino, n-propylamino, isopropylamino, cyclopropylamino, n-butylamino, isobutylamino, sec-butylamino, tert-butylamino, cyclobutylamino, n-amylamino, isoamylamino, sec-amylamino, tert-amylamino, neopentylamino, cyclopentylamino, n-hexylamino, isohexylamino, sec-hexylamino, tert-hexylamino, cyclohexylamino, straight chain or branched heptylamino, straight chain or branched octylamino, straight chain or branched nonylamino, straight chain or branched decylamino, straight chain or branched undecylamino, straight chain or branched dodecylamino, straight chain or branched tridecylamino, straight chain or branched tetradecylamino, straight chain or branched pentadecylamino, straight chain or branched hexadecylamino, straight chain or branched heptadecylamino, straight chain or branched octadecylamino, adamantylamino, and 1,1,3,3-tetramethylbutylamino.

Among them, more preferably examples are methylamino, ethylamino, n-propylamino, isopropylamino, cyclopropylamino, n-butylamino, isobutylamino, sec-butylamino, tert-butylamino, cyclobutylamino, n-amylamino, isoamylamino, sec-amylamino, tert-amylamino, neopentylamino, cyclopentylamino, n-hexylamino, isohexylamino, sec-hexylamino, tert-hexylamino, cyclohexylamino, straight chain or branched heptylamino, straight chain or branched octylamino, straight chain or branched nonylamino, straight chain or branched decylamino, straight chain or branched undecylamino, straight chain or branched dodecylamino, and adamantylamino, and particularly preferable examples are methylamino, ethylamino, n-propylamino, isopropylamino, cyclopropylamino, n-butylamino, isobutylamino, sec-butylamino, tert-butylamino, cyclobutylamino, n-amylamino, isoamylamino, sec-amylamino, tert-amylamino, neopentylamino, cyclopentylamino, n-hexylamino, isohexylamino, sec-hexylamino, tert-hexylamino, cyclohexylamino, straight chain or branched heptylamino, straight chain or branched octylamino, and adamantylamino.

The $C_{1-21}$ aralkylamino represented by $R^1$ may have a substituent group. Preferable examples of the $C_{1-21}$ aralkylamino optionally having a substituent group include benzylamino, α-methyl-benzylamino, 3-isopropenyl-α,α-dimethylbenzylamino, and trans-2-phenylcyclopropylamino and among them, especially preferable examples are benzylamino, α-methyl-benzylamino, and 3-isopropenyl-α,α-dimethylbenzylamino and particularly preferable examples are benzylamino and 3-isopropenyl-α,α-dimethylbenzylamino.

The $C_{1-21}$ arylamino represented by $R^1$ may have a substituent group. The $C_{1-21}$ arylamino optionally having a substituent group include phenylamino, naphthylamino, and biphenylamino and among them, especially preferably examples are phenylamino and naphthylamino and a particularly preferable example is phenylamino.

As the groups represented by $R^1$, methacryloylamino and ethoxycarbonylamino are also preferable.

In the above-mentioned general formula (I), $R^2$ represents a single bond, —$CH_2$—, —$CH_2CH_2$—, —$CH_2CH_2CH_2$— or —$CH_2CH_2CH_2CH_2$—. Among them, a single bond, —$CH_2$—, and —$CH_2CH_2$— are more preferable and a single bond and —$CH_2$— are particularly preferable.

In the above-mentioned general formula (I), $R^3$ represents hydrogen, $C_{1-21}$ alkyl, a halogen, hydroxyl, or a $C_{1-21}$ alkoxy and the alkyl and alkoxyl may have a substituent group.

As the group represented by $R^3$, preferable examples include hydrogen, methyl, ethyl, n-propyl, isopropyl, cyclopropyl, n-butyl, isobutyl, sec-butyl, tert-butyl, cyclobutyl, n-amyl, isoamyl, sec-amyl, tert-amyl, neopentyl, cyclopentyl, n-hexyl, isohexyl, sec-hexyl, tert-hexyl, cyclohexyl, fluoro, chloro, bromo, trifluoromethyl, hydroxyl, methoxy, ethoxy, n-propoxy, isopropoxy, cyclopropoxy, n-butoxy, isobutoxy, sec-butoxy, tert-butoxy, cyclobutoxy, n-amyloxy, isoamyloxy, sec-amyloxy, tert-amyloxy, neopentyloxy, cyclopentyloxy, n-hexyloxy, isohexyloxy, sec-hexyloxy, tert-hexyloxy, and cyclohexyloxy.

Among them, especially preferable examples are hydrogen, methyl, ethyl, n-propyl, isopropyl, n-butyl, isobutyl, sec-butyl, tert-butyl, n-amyl, isoamyl, sec-amyl, tert-amyl, neopentyl, cyclopentyl, n-hexyl, isohexyl, sec-hexyl, tert-hexyl, cyclohexyl, fluoro, chloro, bromo, trifluoromethyl, hydroxyl, methoxy, ethoxy, n-propoxy, isopropoxy, n-butoxy, isobutoxy, sec-butoxy, tert-butoxy, n-amyloxy, isoamyloxy, sec-amyloxy, tert-amyloxy, neopentyloxy, cyclopentyloxy, n-hexyloxy, isohexyloxy, sec-hexyloxy, tert-hexyloxy, and cyclohexyloxy and particularly preferable examples are hydrogen, methyl, ethyl, n-propyl, isopropyl, n-butyl, isobutyl, sec-butyl, tert-butyl, n-amyl, isoamyl, sec-amyl, tert-amyl, neopentyl, cyclopentyl, n-hexyl, tert-hexyl, cyclohexyl, fluoro, chloro, trifluoromethyl, hydroxyl, methoxy, ethoxy, n-propoxy, isopropoxy, n-butoxy, isobutoxy, sec-butoxy, tert-butoxy, n-amyloxy, isoamyloxy, sec-amyloxy, tert-amyloxy, neopentyloxy, cyclopentyloxy, n-hexyloxy, and cyclohexyloxy.

In the above-mentioned general formula (I), $R^4$ represents a $C_{1-21}$ alkyl, a $C_{2-21}$ alkenyl, a $C_{1-21}$ aryl, or a $C_{1-21}$ aralkyl and the alkyl, alkenyl, aryl, and aralkyl may have a substituent group. Further, in the case of the above mentioned colorant-containing curable composition or filter using the composition, $R^4$ may also be hydrogen in addition to the above mentioned groups.

The $C_{1-21}$ alkyl represented by $R^4$ may be a straight chain, branched, or cyclic alkyl and preferable examples include methyl, ethyl, n-propyl, isopropyl, cyclopropyl, n-butyl, isobutyl, sec-butyl, tert-butyl, cyclobutyl, n-amyl, isoamyl, sec-amyl, tert-amyl, neopentyl, cyclopentyl, n-hexyl, isohexyl, sec-hexyl, tert-hexyl, cyclohexyl, cyclohexylmethyl, cyclopentyl, cyclopropylmethyl, norbornyl, cyclobutylmethyl, bicyclooctyl, straight chain or branched heptyl, cyclopentylethyl, adamantyl, adamantylmethyl, noradamantyl, straight chain or branched octyl, straight chain or branched nonyl, straight chain or branched decyl, straight chain or branched undecyl, straight chain or branched dodecyl, straight chain or branched tridecyl, straight chain or branched tetradecyl, straight chain or branched pentadecyl, straight chain or branched hexadecyl, straight chain or branched heptadecyl, straight chain or branched octadecyl, straight chain or branched nonadecyl, and straight chain or branched eicosanyl.

Among them, more preferable examples are methyl, ethyl, n-propyl, isopropyl, cyclopropyl, n-butyl, isobutyl, sec-butyl, tert-butyl, cyclobutyl, n-amyl, isoamyl, sec-amyl, tert-amyl, neopentyl, cyclopentyl, n-hexyl, isohexyl, sec-hexyl, tert-hexyl, cyclohexyl, cyclohexylmethyl, cyclopentyl, cyclopropylmethyl, norbornyl, cyclobutylmethyl, adamantyl, adamantylmethyl, noradamantyl, straight chain or branched heptyl, cyclopentylethyl, straight chain or branched octyl, straight chain or branched nonyl, straight chain or branched decyl, straight chain or branched undecyl, and straight chain or branched dodecyl and particularly preferable examples are methyl, ethyl, n-propyl, isopropyl, cyclopropyl, n-butyl, isobutyl, sec-butyl, tert-butyl, cyclobutyl, n-amyl, isoamyl, sec-amyl, tert-amyl, neopentyl, cyclopentyl, n-hexyl, isohexyl, sec-hexyl, tert-hexyl, cyclohexyl, cyclohexylmethyl, cyclopentyl, cyclopropylmethyl, cyclobutylmethyl, norbonyl, cyclopentylethyl, 2-ethylhexyl, adamantyl, adamantylmethyl, and noradamantyl.

The $C_{2-21}$ alkenyl represented by $R^4$ include vinyl, isopropenyl, 2-propenyl, 2-methyl-propenyl, 1-methyl-1-propenyl, 1-butenyl, 3-butenyl, 1-methyl-1-butenyl, 1,1-dimethyl-3-butenyl, 1-pentenyl, 2-pentenyl, 1-ethyl-1-pentenyl, 1-hexenyl, 1-heptenyl, 2,6-dimethyl-5-heptenyl, 9-decenyl, 1-cyclopentenyl, 2-cyclopentenylmethyl, cyclohexenyl, 1-methyl-2-cyclohexenyl, and 1,4-dihydro-2-methylphenyl.

Among them, more preferable examples are vinyl, isopropenyl, 2-propenyl, 2-methyl-propenyl, 1-methyl-1-propenyl, 1-butenyl, 3-butenyl, 1-methyl-1-butenyl, 1,1-dimethyl-3-butenyl, 1-pentenyl, 2-pentenyl, 1-ethyl-1-pentenyl, 1-hexenyl, 1-heptenyl, 1-cyclopentenyl, 2-cyclopentenylmethyl, cyclohexenyl, 1-methyl-2-cyclohexenyl, and 1,4-dihydro-2-methylphenyl. Particularly preferable examples are vinyl, isopropenyl, 2-propenyl, 2-methyl-propenyl, 1-methyl-1-propenyl, 1-butenyl, 3-butenyl, 1-methyl-1-butenyl, 1,1-dimethyl-3-butenyl, 1-pentenyl, 2-pentenyl, 1-ethyl-1-pentenyl, 1-hexenyl, 1-cyclopentenyl, 2-cyclopentenylmethyl, cyclohexenyl, 1-methyl-2-cyclohexenyl, and 1,4-dihydro-2-methylphenyl.

The $C_{1-21}$ aryl represented by $R^4$ include phenyl, naphthyl, biphenylenyl, acenapthenyl, fluorenyl, anthracenyl, anthraquinonyl, and pyrenyl and among them, more preferable examples are phenyl, naphthyl, biphenylenyl, acenaphthenyl, fluorenyl, and anthracenyl, and particularly preferable examples are phenyl, naphthyl, biphenylenyl, and fluorenyl.

The $C_{1-21}$ aralkyl represented by $R^4$ may have a substituent group. Preferable examples of the $C_{1-21}$ aralkyl optionally having a substituent group include benzyl, diphenylmethyl, α-methylbenzyl, α-dimethylbenzyl, α-trifluoromethylbenzyl, 1,2-diphenyl-2-propyl, 1-phenyl-1-propyl, 2,2-dimethyl-1-phenyl-1-propyl, 1-phenyl-1-butyl, α-cyclopropylbenzyl, cyclopropyldiphenylmethyl, phenylethyl, α-methyl-phenylethyl, β-methyl-phenylethyl, 3-phenylpropyl, phenylbutyl, cinnamyl, naphthylmethyl, fluorenyl, fluorenylmethyl, 1,2,3,4-tetrahydronaphthyl, indanyl, acenaphthyl, anthracenyl, and pyrenemethyl.

Among them, more preferable examples are benzyl, diphenylmethyl, α-methylbenzyl, α-dimethylbenzyl, α-trifluoromethylbenzyl, α-cyclopropylbenzyl, phenylethyl, α-methyl-phenylethyl, β-methyl-phenylethyl, 3-phenylpropyl, phenylbutyl, cinnamyl, naphthylmethyl, fluorenyl, fluorenylmethyl, acenaphthyl, anthracenmethyl, and pyrenemethyl, and particularly preferable examples are benzyl, diphenylmethyl, α-methylbenzyl, α-trifluoromethylbenzyl, phenylethyl, 3-phenylpropyl, phenylbutyl, cinnamyl, fluorenyl, and fluorenylmethyl.

In the case groups represented by $R^1$, $R^3$, and $R^4$ have substituent groups, preferable examples of the substituent groups include trifluoromethyl, fluoro, chloro, bromo, methoxy, hydroxy, nitro, methyl, ethyl, n-propyl, isopropyl, n-butyl, isobutyl, sec-butyl, tert-butyl, pentyl, hexyl, heptyl, octyl, vinyl, dimethylamino, phenyl, and ethoxycarbonyl, and among them, more preferable examples are trifluoromethyl, fluoro, chloro, methoxy, ethoxy, hydroxy, methyl, ethyl, n-propyl, isopropyl, n-butyl, isobutyl, sec-butyl, tert-butyl, pentyl, hexyl, heptyl, octyl, vinyl, dimethylamino, phenyl, and ethoxycarbonyl and particularly preferable examples are trifluoromethyl, fluoro, chloro, methoxy, hydroxy, methyl, ethyl, n-propyl, isopropyl, n-butyl, isobutyl, sec-butyl, tert-butyl, pentyl, vinyl, dimethylamino, phenyl, and ethoxycarbonyl. Further, these substituent groups may have a substituent group as above.

The number of the substituent groups is preferably 0 to 4, more preferably 0 to 3, and particularly preferably 0 to 2.

In the above-mentioned general formula (I), $R^5$ represents hydrogen, a metal cation, or a cation of a nitrogen-containing compound. As $R^5$, hydrogen, Na, K, Rb, Cs or a cation of a nitrogen-containing compound is preferable and among them, hydrogen, Na, K, Rb, or a cation of a nitrogen-containing compound is more preferable.

The nitrogen-containing compound represented by $R^5$ may be selected in consideration of all of the following; solubility in an organic solvent or water, salt forming poperty, absorbance and color value of a dye, and heat resistance and light fastness as a colorant, and the like. In the case, the compound is selected in consideration of only the absorbance and color value, those with a molecular weight as low as possible are preferable as the nitrogen-containing compound and among them, those having a molecular weight of 300 or less are preferable, those having a molecular weight of 280 or less are more preferable, and those having a molecular weight of 250 or less are particularly preferable.

Hereinafter, specific examples of the above-mentioned nitrogen-containing compound will be exemplified, however the invention is not limited to these examples.

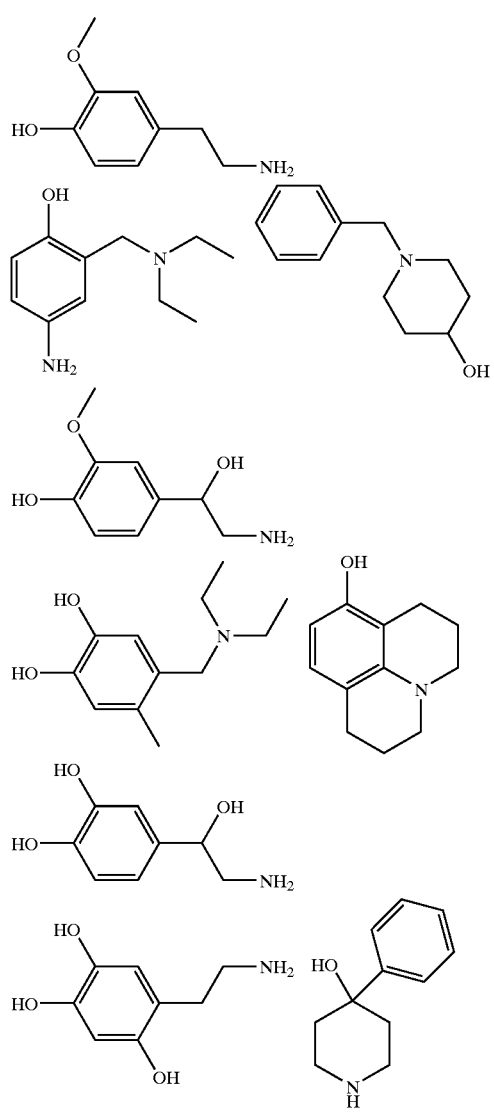

-continued

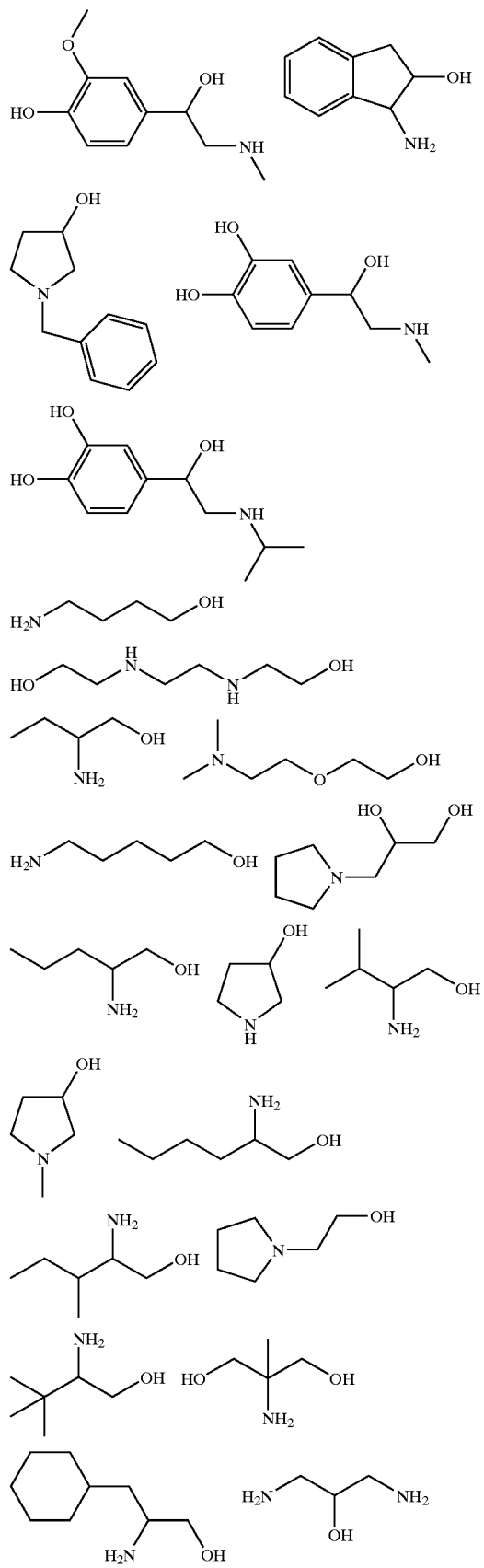

-continued
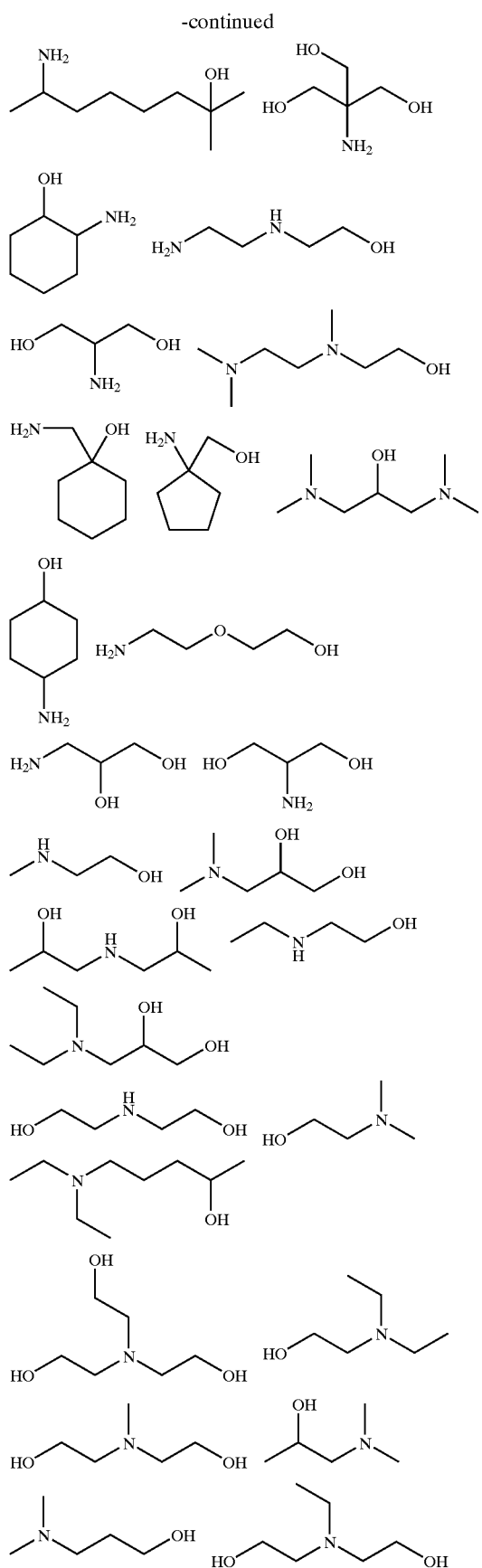
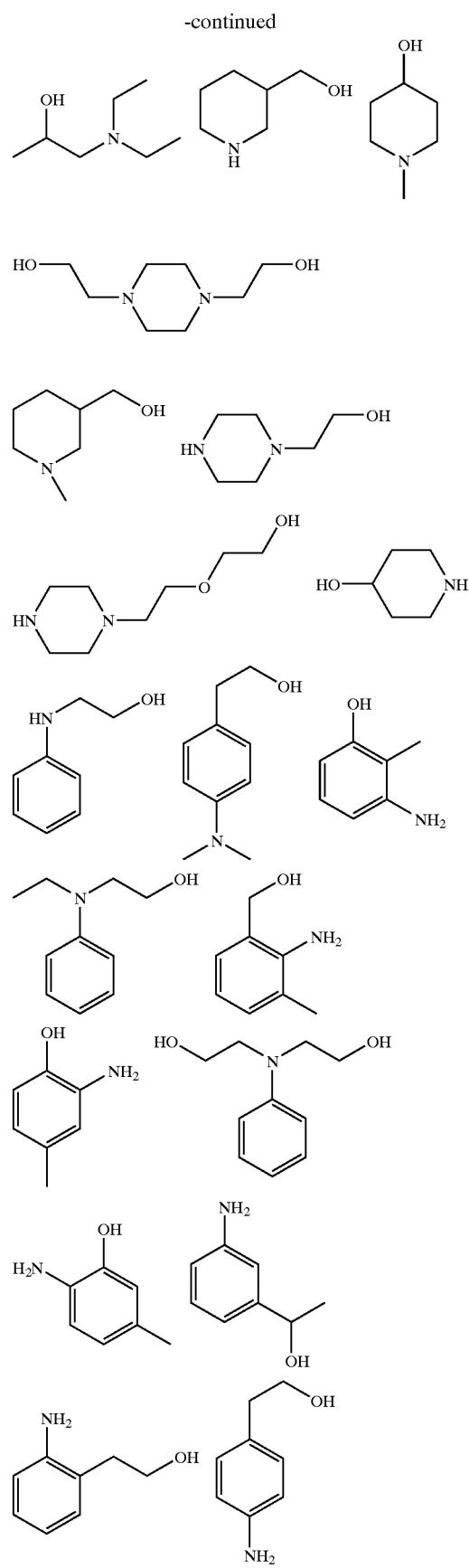

-continued
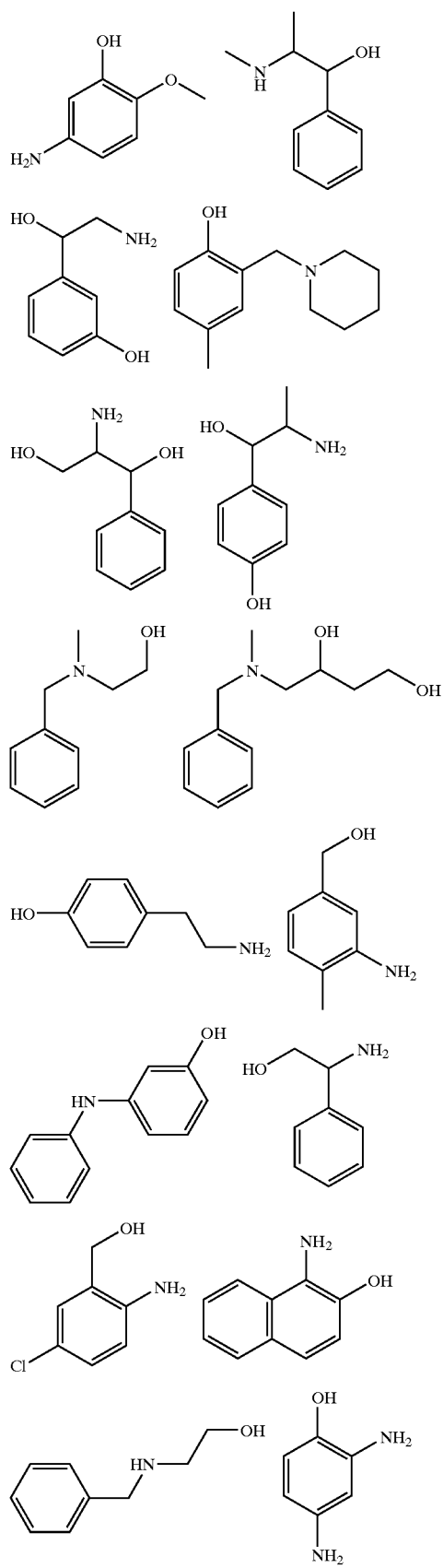
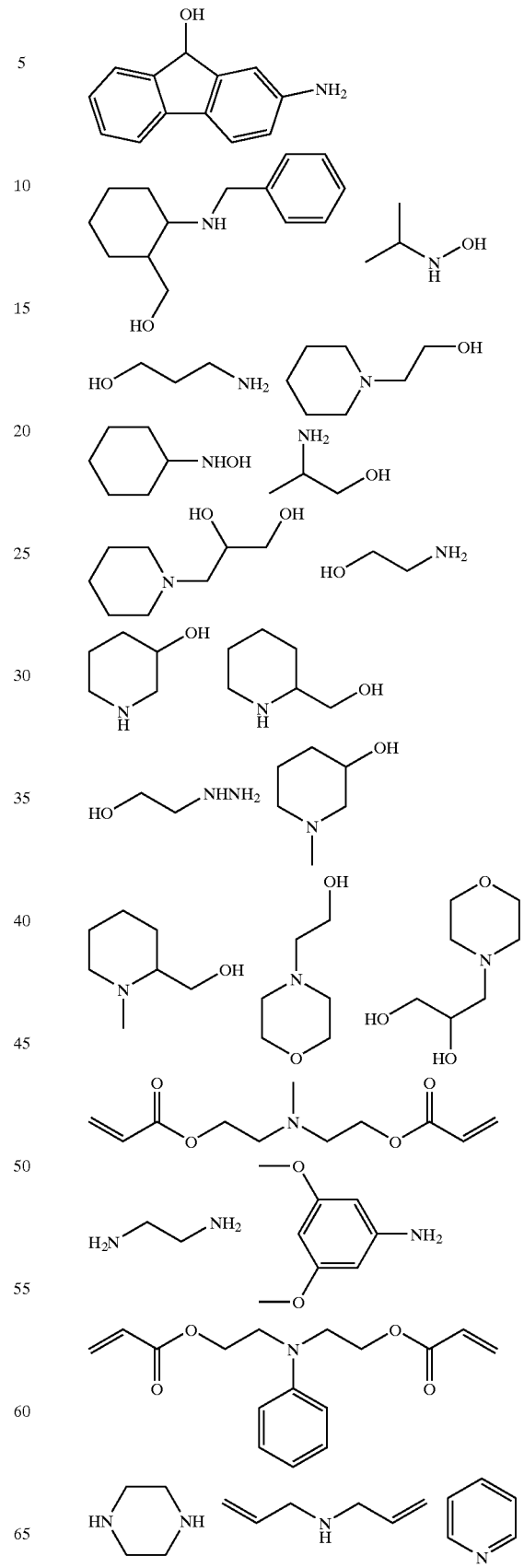

-continued

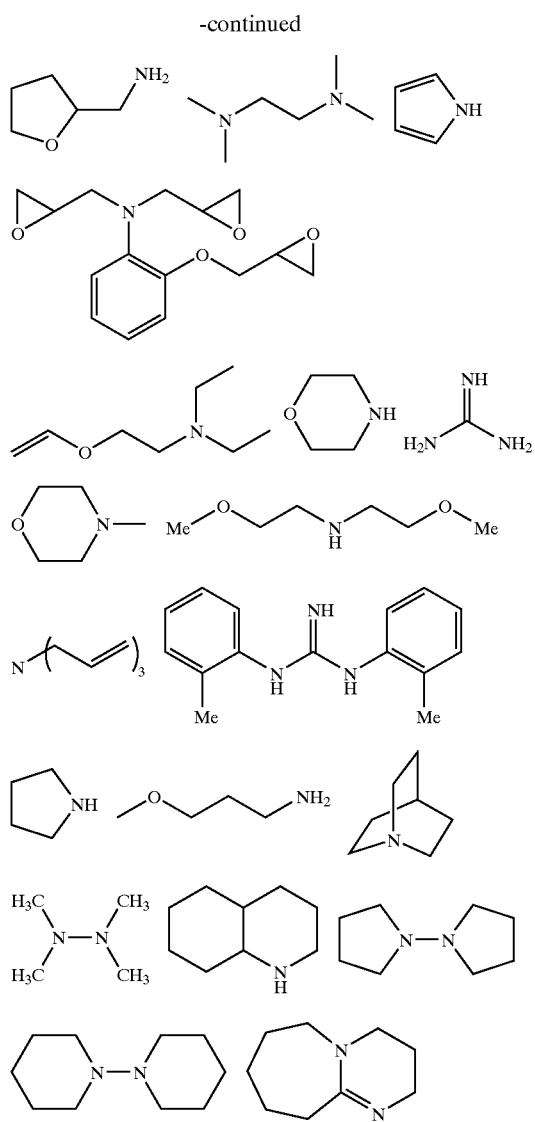

-continued

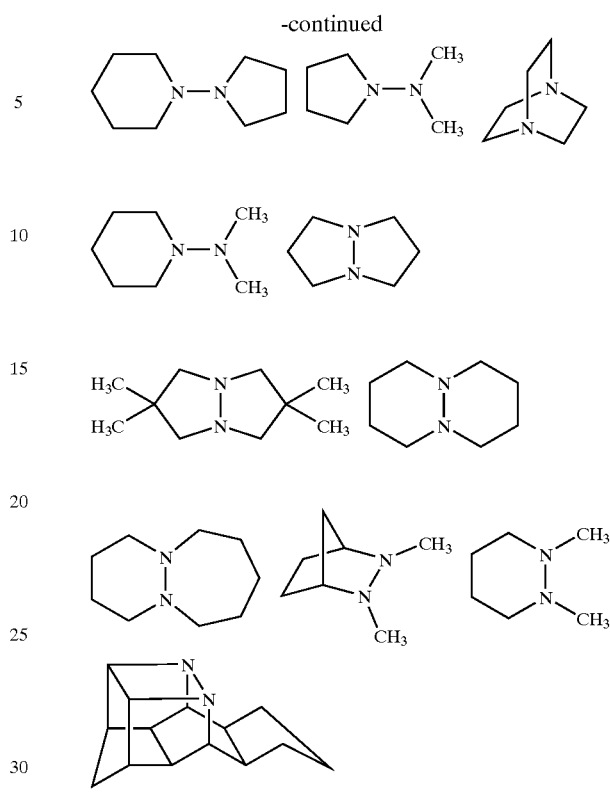

In the above-mentioned general formula (I), the reference character m denotes an integer of 1 to 2 and the reference character n denotes an integer of 0 to 4. Further, in the case of the above mentioned colorant-containing curable composition or filter using the composition, the reference character m may also be 0 in addition to the above-mentioned integers. The above-mentioned reference character m is preferably 1 and n is preferably an integer of 0 to 3, more preferably 0 to 2, and particularly preferably 0 or 1.

Hereinafter, specific examples of the azo compound represented by the general formula (I) will be exemplified [examples (1) to (29)]. However, the invention is not limited to these examples.

(1)

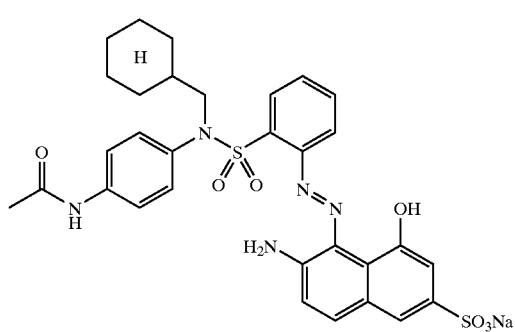

(2)

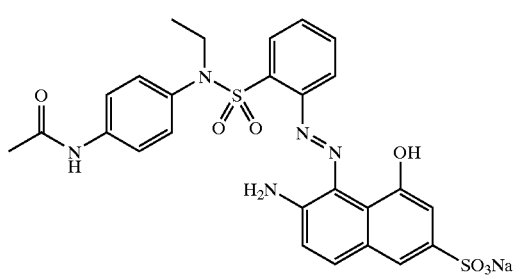

-continued
(3)
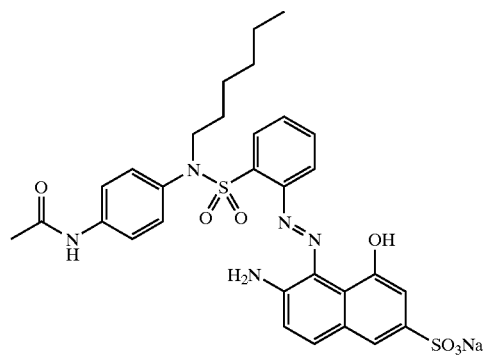
(4)
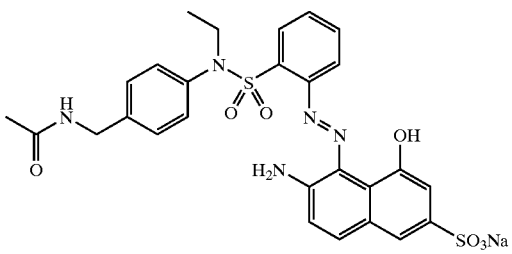
(5)
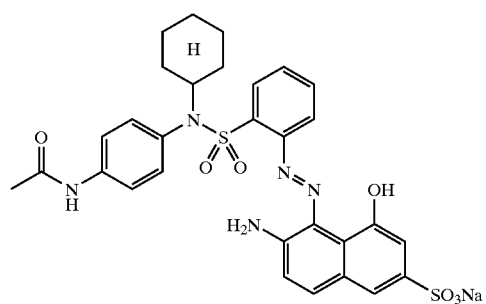
(6)
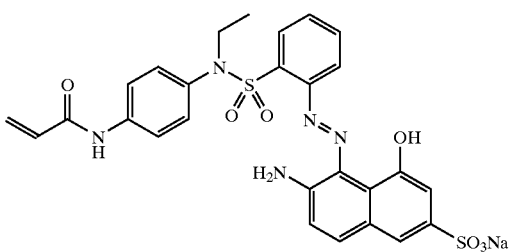
(7)
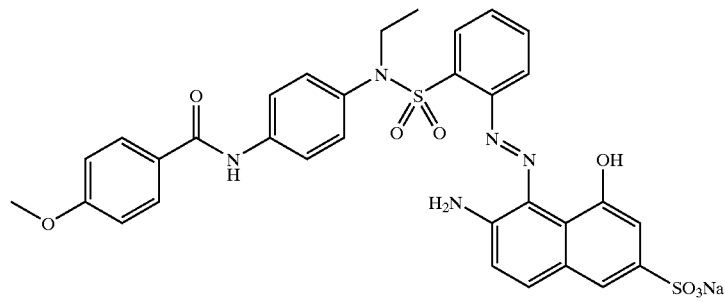
(8)
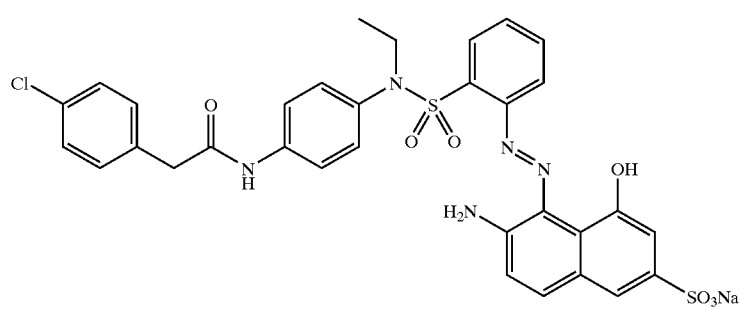
(9)
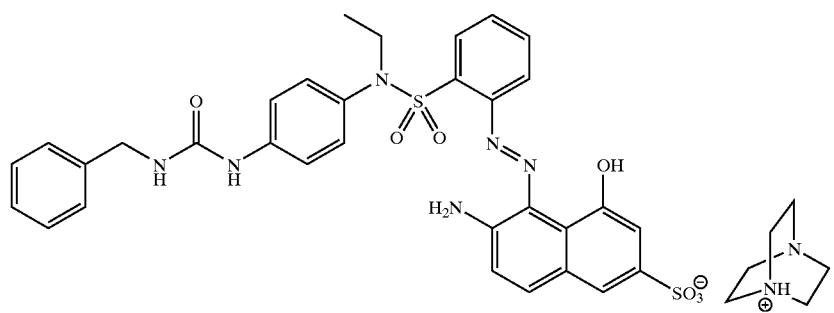

-continued
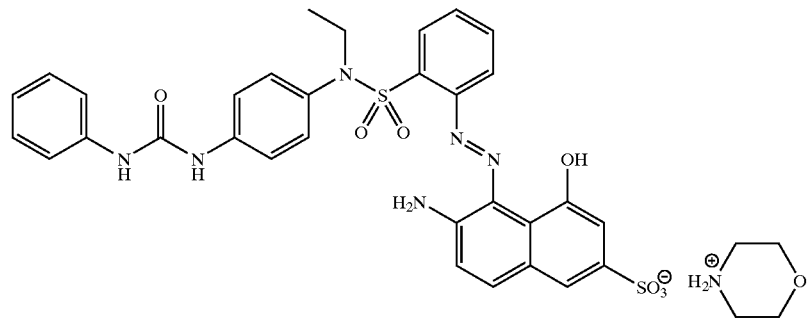
(10)
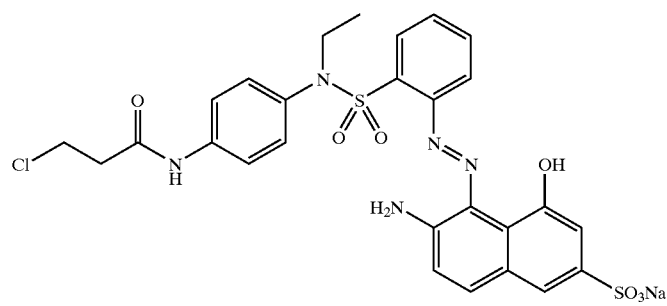
(11)
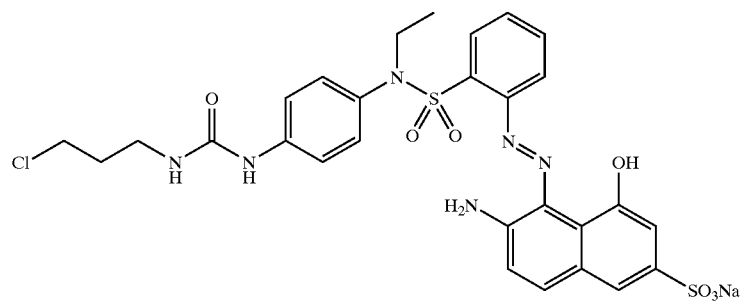
(12)
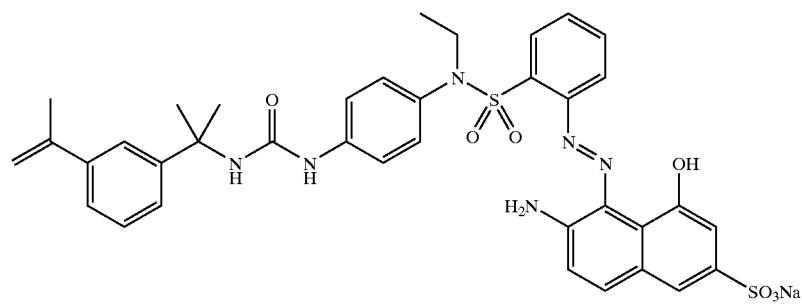
(13)
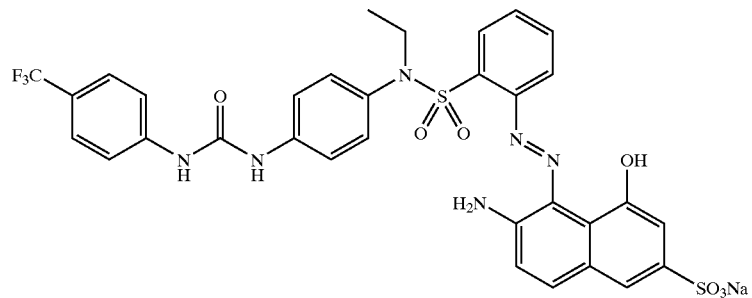
(14)

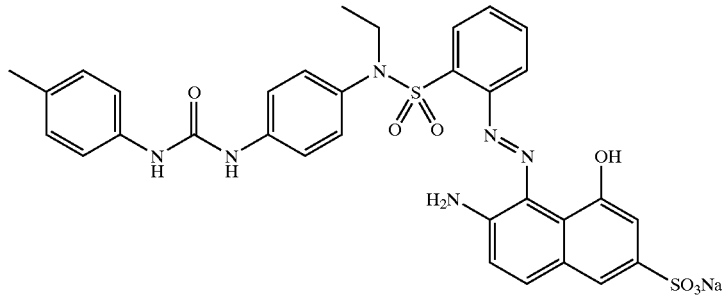
(15)
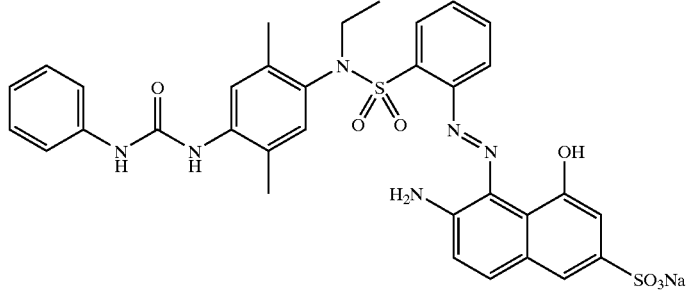
(16)
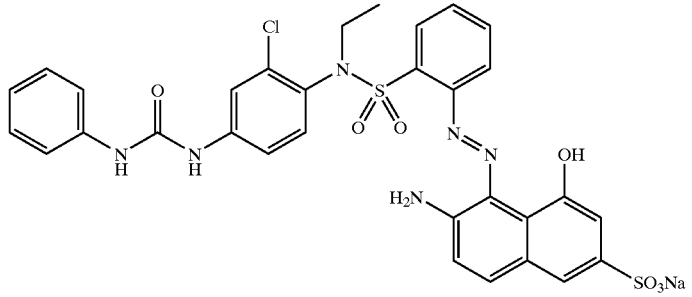
(17)
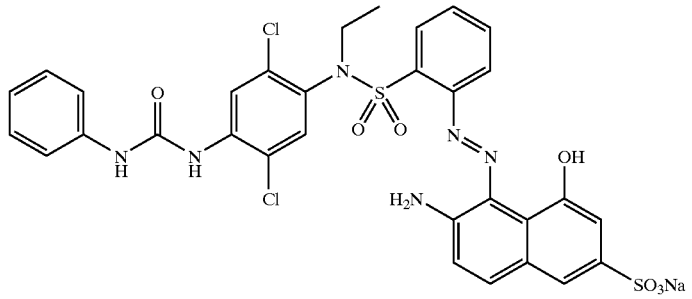
(18)
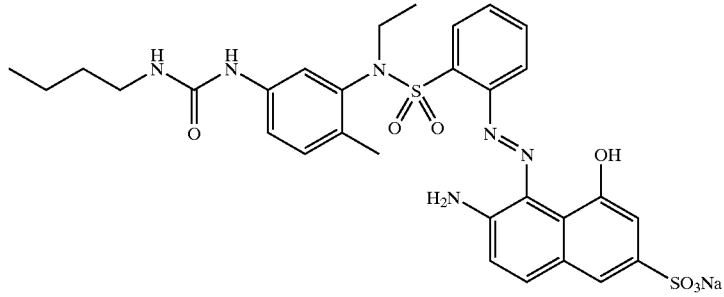
(19)

(20)
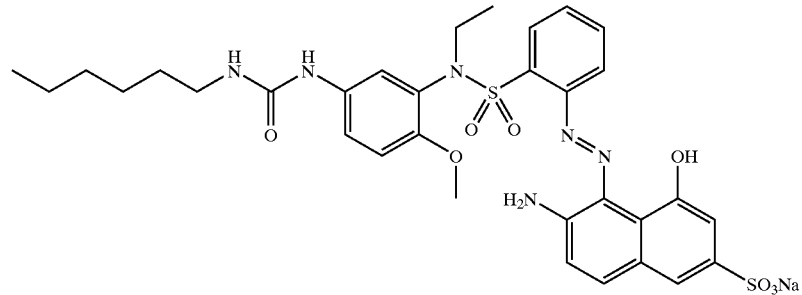
(21)
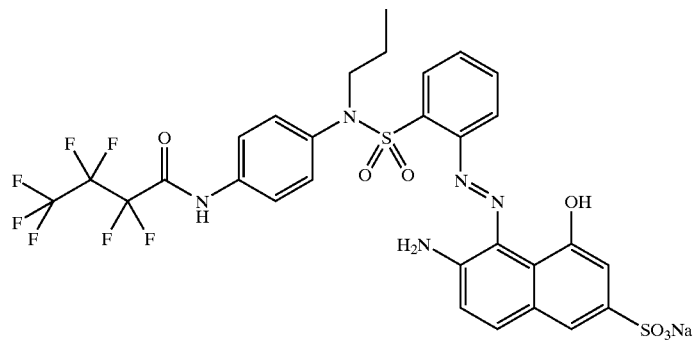
(22)
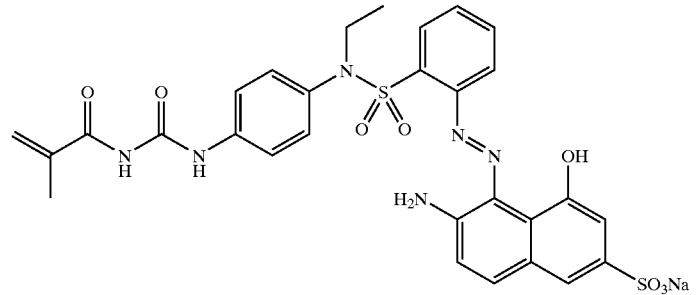
(23)
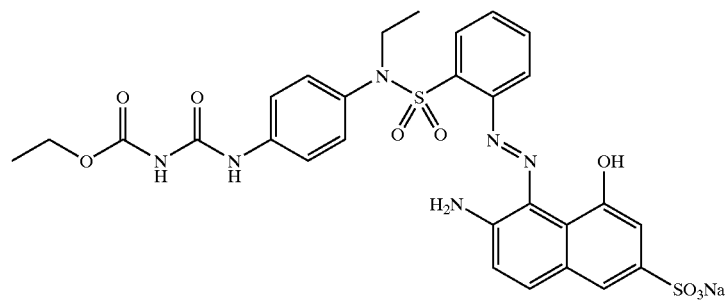

-continued (24)

(25)

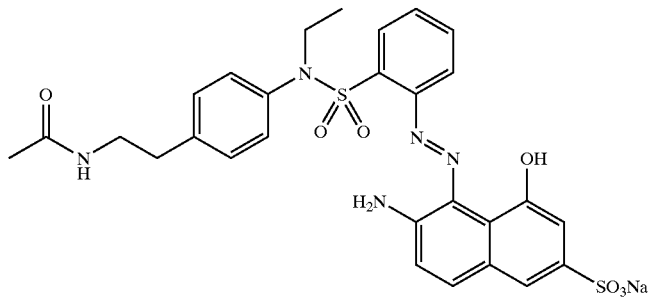

(26)

(27)

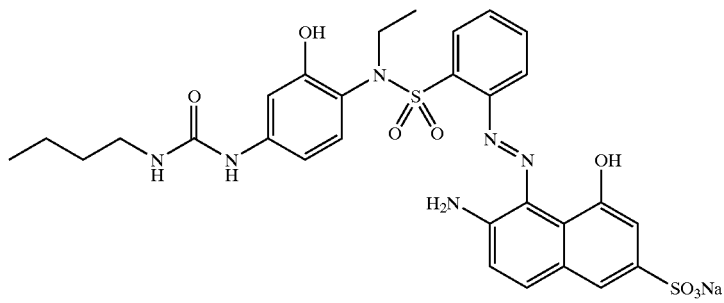

(28)

(29)

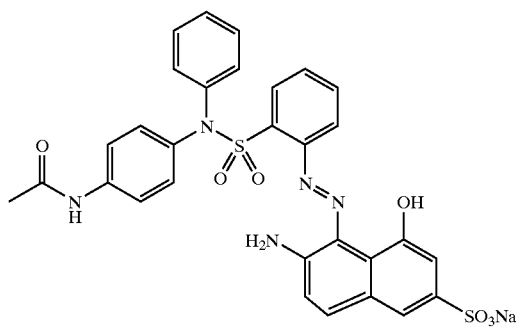
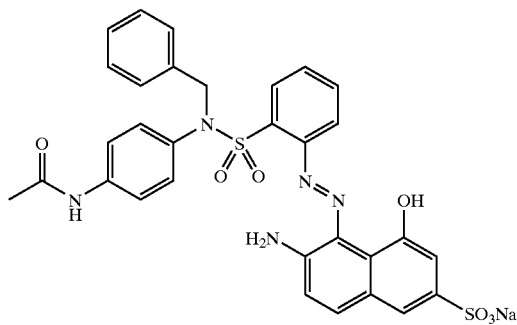

The azo compound of the invention can suitably be used for color pixel formation for a color filter to be employed for a liquid crystal display device (LCD), a solid state image pickup device (e.g. CCD, CMOS and the like) and a color filter for electroluminescence and alternatively, the azo compound can also suitably be used for producing printing ink, ink for ink jet, and a coating material.

In the case the azo compound is used for the above-mentioned colorant-containing curable composition or a color filter containing the composition, in addition to the above examples, the following specific examples can be exemplified [examples (30) to (32)]. However, the invention is not limited to these examples.

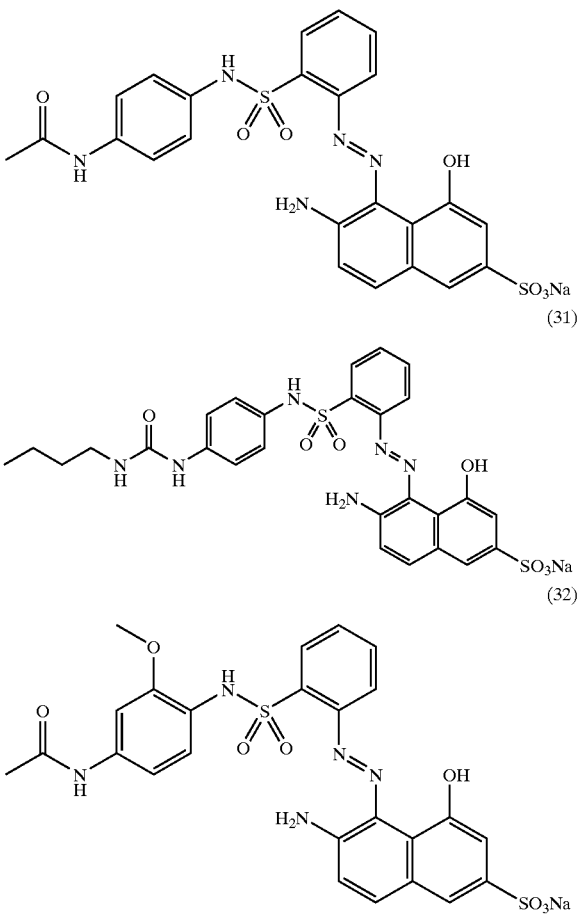

(Acidic Dye)

The azo compound represented by the above-mentioned general formula (I) may be used in combination with another acidic dye, a salt of another acidic dye with a metal or a nitrogen-containing compound, a derivative of another acidic dye and the like. Hereinafter, the acidic dye will be described.

The above-mentioned acidic dye is not particularly limited as long as it contains an acidic group such as sulfonic acid or carboxylic acid and may be selected in consideration of all of the necessary performances such as solubility in an organic solvent or a developer to be used for the composition preparation and development treatment, salt formability, absorbance, interaction with other components of a curable composition, light fastness, heat resistance, and the like.

Hereinafter, specific examples of the acidic dye will be exemplified as follows, however the invention is not limited to these examples:

acid alizarin violet N;
acid black 1, 2, 24, 48;
acid blue 1, 7, 9, 15, 18, 23, 25, 27, 29, 40, 45, 62, 70, 74, 80, 83, 86, 87, 90, 92, 103, 112, 113, 120, 129, 138, 147, 158, 171, 182, 192;
acid chrome violet K;
acid Fuchsin;
acid green 1, 3, 5, 9, 16, 25, 27, 50;
acid orange 6, 7, 8, 10, 12, 50, 51, 52, 56, 63, 74, 95;
acid red 1, 4, 8, 14, 17, 18, 26, 27, 29, 31, 34, 35, 37, 42, 44, 50, 51, 52, 57, 66, 73, 80, 87, 88, 91, 92, 94, 97, 103, 111, 114, 129, 133, 134, 138, 143, 145, 150, 151, 158, 176, 183, 198, 211, 215, 216, 217, 249, 252, 257, 260, 266, 274;
acid violet 6B, 7, 9, 17, 19;
acid yellow 1, 3, 7, 9, 11, 17, 23, 25, 29, 34, 36, 42, 54, 72, 73, 76, 79, 98, 99, 111, 112, 114, 116; Food Yellow 3; and the derivatives of these dyes.

Among them, particularly preferable examples include the following dyes:
acid black 24;
acid blue 23, 25, 29, 62, 86, 87, 92, 138, 158;
acid orange 8, 51, 56, 74, 63, 74;
acid red 1, 4, 8, 34, 37, 42, 52, 57, 80, 97, 114, 143, 145, 151, 183, 217;
acid violet 7;
acid yellow 17, 25, 29, 34, 42, 72, 76, 99, 111, 112, 114, 116; and the derivatives of these dyes.

Also, azo type acidic dyes, xanthene type acidic dyes or phthalocyanine type acidic dyes other than the above-exemplified dyes are also preferable and specific examples of the acidic dyes include C.I. Solvent Blue 44, 38; C.I. Solvent Orange 45; Rhodamine B; Rhodamine 110; 2,7-Naphthalenedisulfonic acid, 3-[(5-chloro-2-phenoxyphenyl)hydrazono]-3,4-dihydro-4-oxo-5-[(phenylsulfonyl)amino]-, and derivatives thereof.

Next, an atomic group forming a salt with an acidic dye will be described. The atomic group forming a salt with an acidic dye is not particularly limited as long as it is cationic and capable of forming a salt with an anion of the acidic dye and it includes, for example, of the cations of hydrogen atom, Na, K, Rb, Cs, and a nitrogen-containing compound.

The nitrogen-containing compound for forming a salt with an acidic dye may be selected in consideration of all of the necessary performances such as the solubility in an organic solvent and a developer solution to be employed for the composition preparation and development treatment, salt formability, absorbance of a dye, compatibility with other components of the curable composition, and the like. In the case the compound is selected from a viewpoint of only the absorbance, those having a molecular weight as low as possible are preferable and those having a molecular weight of 245 or lower are more preferable: those having a molecular weight of 240 or lower are particularly preferable: and those having a molecular weight of 230 or lower are especially preferable.

Also, a nitrogen-containing compound commonly known as an anti-fading agent may be used for the purpose of light-fading prevention and heat resistance improvement of a dye and from this point, a compound having a lower oxidation potential (lower ionization potential), a tertiary amine compound, an aliphatic cyclic amine compound, an aniline type compound, a hydrazine type compound and the like are preferable.

Specific examples of preferable nitrogen-containing compounds are same as the nitrogen-containing compounds exemplified as $R^5$ in the above-mentioned general formula (I)

Next, the mole ratio (=n) of (atomic group forming salt with acidic dye)/(acidic dye) in the above-mentioned acidic dye will be descried. The reference character n is a value determining the mole ratio of the atomic group, which is a counter-ion of the acidic dye molecule and can be selected optionally depending on the salt formation condition of the atomic group-acidic dye. Specifically, n is a numeric value within a number of the functional groups of the acid of the acidic dye and satisfies $0<n\leq 10$ and may properly be selected in consideration of an order of preference of all the required performances, such as solubility in an organic solvent or a developer, salt forming performance, absorbance, interaction with other components of a curable composition, light fastness, heat resistance, and the like. In the case the numeric value is selected from a viewpoint of only the absorbance, n is preferably in a range $0<n\leq 7$; more preferably $0<n\leq 6$, and particularly preferably $0<n\leq 5$.

Although it differs depending on the type of the colorant, the total concentration of the above-mentioned colorant, that is an azo compound (if necessary, an acidic dye) represented by the general formula (I) in the entire solid components in the colorant-containing curable composition is preferably 0.5 to 80% by mass, more preferably 0.5 to 60% by mass, and particularly preferably 0.5 to 50% by mass.

(Binder)

A colorant-containing curable composition of the invention contains at least one kind of binders and the binder is not particularly limited as long as it is alkali-soluble, and is preferably selected in consideration of heat resistance, developing property, and availability.

Preferable binders are linear organic high molecular weight polymers which are soluble in an organic solvent and developable in an aqueous weakly alkaline solution. Examples of such linear organic high molecular weight polymers may include polymers having carboxylic acid in the side chains such as methacrylic acid copolymers, acrylic acid copolymers, itaconic acid copolymers, crotonic acid copolymers, maleic acid copolymers, partially esterified maleic acid copolymers and the like described in JP-A No. 59-44615, Japanese Patent Application Publication (JP-B) Nos. 54-34327, 58-12577, and 54-25957, and JP-A Nos. 59-53836 and 59-71048. Also, acidic cellulose delivatives having carboxylic acid in the side chain are preferably used.

Other than the above-mentioned polymers, polymers obtained by adding acid anhydrides to polymers having hydroxy groups, polyhydroxystyrene type resins, polysiloxane type resins, poly(2-hydroxyethyl(meth)acrylate), polyvinylpyrrolidone, polyethylene oxide, and poly(vinyl alcohol) are also useful.

Further, monomers having hydrophilicity may be copolymerized and examples of such monomers are alkoxyalkyl (meth)acrylate, hydroxyalkyl (meth)acrylate, glycerol (meth)acrylate, (meth)acrylamide, N-methylolacrylamide, secondary or tertiary alkylacrylamide, dialkylaminoalkyl (meth)acrylate, morpholine (meth)acrylate, N-vinylpyrrolidone, N-vinylcaprolactam, vinylimidazole, vinyltriazole, methyl (meth)acrylate, ethyl (meth)acrylate, branched or straight chain propyl (meth)acrylate, branched or straight chain butyl (meth)acrylate, phenoxyhydroxypropyl (meth) acrylate, and the like.

Additionally, examples of the above-mentioned monomers having hydrophilicity also include monomers having tetrahydrofurfuryl group, phosphoric acid, phosphoric ester, quaternary ammonium salts, ethyleneoxy chain, oxypropylene chain, sulfonic acid and salts thereof, and morpholinoethyl group.

Further, the binder may have polymerizable groups in the side chains for improving the cross-linking efficiency and polymers having allyl group, (meth)acryl group, allyloxyalkyl group and the like in the side chains are also usable.

Hereinafter, polymers having these polymerizable groups will be exemplified, however they are not particularly limited to the following examples so long as they contain alkali-soluble groups such as COOH, OH and ammonium and unsaturated bonds between carbon atoms.

As specific examples, compounds obtained by reaction of a compound having epoxy ring reactive on OH group and an unsaturated bond between carbon atoms (e.g. glycidyl acrylate) with a copolymer of an OH-group-containing monomer, e.g. 2-hydroxyethyl acrylate, a COOH-containing monomer, e.g. methacrylic acid, and a monomer of an acrylic or vinyl compound copolymerizable with these monomers can be used.

Those reactive on OH group may include compounds having acid anhydride, isocyanate group, or acryloyl, other than epoxy ring. Also, reaction products obtained by reaction of a saturated or unsaturated polybasic acid anhydride with a compound obtained by reaction of an unsaturated carboxylic acid such as acrylic acid with a compound having an epoxy ring as described JP-A No. 6-102669 and 6-1938 can be used.

Examples of the compound having alkali-soluble group such as COOH and an unsaturated bond between carbon atoms are Dianal NR series (manufactured by Mitsubishi Rayon Co., Ltd.); Photomer 6173 (COOH-containing Polyurethane Acrylic Oligomer manufactured by Daimond Shamrock Co., Ltd.); Viscoat R-264 and KS resist (manufactured by Osaka Organic Chemical Industry Co., Ltd.); Cyclomer P series Placcel CF 200 series (manufactured by Daicel Chem. Ind., Ltd.); and Ebecryl 3800 (manufactured by Daicel UCB Co., Ltd.).

Among the these binders, from a viewpoint of heat resistance, polyhydroxystyrene type resins, polysiloxane type resins, acrylic resins, acrylamide type resins, and acryl/acrylamide copolymer resins are preferable and acrylic resins, polyhydroxystyrene type resins, and polysiloxane type resins are further preferable. Also, from a viewpoint of developing property controlling, acrylic resins, acrylamide type resins, and acryl/acrylamide copolymer resins are preferable.

Preferable examples of the acrylic resins include copolymers made from monomers selected from the group consisting of benzyl (meth)acrylate, (meth)acrylic acid, hydroxyethyl (meth)acrylate, and (meth)acrylamide; Cyclomer P series Placcel CF 200 series (manufactured by Daicel Chem. Ind., Ltd.); Ebecryl 3800 (manufactured by Daicel UCB Co., Ltd.); Dianal NR series (manufactured by Mitsubishi Rayon Co., Ltd.); and Viscoat R-264 and KS resist 106 (manufactured by Osaka Organic Chemical Industry Co., Ltd.).

Also, to improve the strength of a cured coating, alcohol-soluble nylons and polyethers of 2,2-bis( 4-hydroxyphenyl) propane and epichlorohydrin are also useful.

Further, alkali-soluble phenol resins may be used. The alkali-soluble phenol resins can be used preferably when constituting the colorant-containing curable composition of the invention into a positive-working type structure. Examples of alkali-soluble phenol resins include novolak resins and vinyl polymers.

Examples of the novolak resins include products obtained by condensation reaction of phenols and aldehydes in the presence of an acid catalyst. Examples of the phenols are phenol, cresol, ethylphenol, butylphenol, xylenol, phenylphenol, catechol, resorcinol, pyrogallol, naphthol and bisphenol A. These phenols may be used alone or in combination of two or more of them. Examples of the aldehydes are formaldehyde, paraformaldehyde, acetaldehyde, propionaldehyde, and benzaldehyde.

Specific examples of the novolak resins are condensation products of m-cresol, p-cresol and their mixture with formalin. The novolak resins may be adjusted to have controlled molecular weight distribution by using a means such as fluctuation. Also, low molecular weight components having phenolic hydroxyl such as bisphenol C and bisphenol A may be added to the novolak resins.

Among them, alkali-soluble acrylic or methacrylic resins are preferable to be used. Alkali-soluble resins having a polymerizable group in a side chain part (polymerizable side chains) bonded to the main chain are particularly preferable. If the polymerizable group is present, the cross-linking efficiency can be increased regardless of the presence or absense of monomers, and further, the hardness can be effectively improved by the presence of the polymerizable group in the side chain.

The average molecular weight (the value on the basis of polystyrene measured by GPC method) of polymers as the above-mentioned binder is preferably 1,000 to $2 \times 10^5$, more preferably 2,000 to $1 \times 10^5$, and particularly preferably 5,000 to $5 \times 10^4$.

The content of the above-mentioned binder in the colorant-containing curable composition is preferably 10 to 90% by mass, more preferably 20 to 80% by mass, and particularly preferably 30 to 70% by mass in the entire solid components of the composition.

(Cross-Linking Agent)

The colorant-containing curable composition of the invention contains the above descrived azo compound represented by the general formula (I) as a colorant and can promote a curing reaction of a coated film to a higher degree than a convention composition so as to obtain a film with good excellent curability. Additional use of a cross-linking agent makes it possible to form a film that is cured to an even greater extent.

In the invention, it is possible to obtain a film that is cured to a higher degree by additionally using a cross-linking agent. The cross-linking agent will be explained below.

The cross-linking agent to be applied to the invention is not particularly limited as long as it carries out a film curing process through a cross-linking reaction. Examples thereof include (a) epoxy resin, (b) a melamine compound, a guanamine compound, a glycol uryl compound or an urea compound that is substituted by at least one substituent selected from the group consisting of a methylol group, an alkoxymethyl group and an acyloxymethyl group, and (c) a phenol compound, a naphthol compound or a hydroxyl anthracene that is substituted by at least one substituent selected from the group consisting of a methylol group, an alkoxymethyl group and an acyloxymethyl group. Among these, polyfunctional epoxy resin is preferably used.

As (a) epoxy resin, any resin may be used as long as it has an epoxy group and a cross-linking property. Examples thereof include divalent glycidyl group-containing low molecular compounds, such as bisphenol A diglycidyl ether, ethylene glycol diglycidyl ether, butane diol diglycidyl ether, hexane diol diglycidyl ether, dihydroxy biphenyl diglycidyl ether, phthalic acid diglycidyl ether and N,N-diglycidyl aniline; also trivalent glycidyl group-containing low molecular compounds, such as trimethylol propane triglycidyl ether, trimethylol phenol triglycidyl ether, Tris P-PA triglycidyl eter, also tetravalent glycidyl group-containing low molecular compounds, such as pentaerythritol tetraglycidyl ether and tetramethylol bisphenol A tetraglycidyl ether; also polyvalent glycidyl group-containing low molecular compounds, such as dipentaerythritol pentaglycidyl ether and dipentaerythritol hexa glycidyl ether; and also glycidyl group-containing polymer compounds, such as polyglycidyl(meth)acrylate and 1,2-epoxy-4-(2-oxyranyl) cyclohexane adduct of 2,2-bis(hydroxymethyl)-1-butanol.

The number of substituting methylol group, alkoxy methyl group and acyloxy methyl group in the cross-linking agent (b) is 2 to 6 in the case of a melamine compound, and 2 to 4 in the case of a glycol uryl compound, a guanamine compound and an urea compound. More preferably, it is 5 to 6 in the case of a melamine compound, and 3 to 4 in the case of a glycol uryl compound, a guanamine compound and an urea compound.

Hereinafter, the above-mentioned (b) melamine compound, guanamine compound, glycol uryl compound and urea compound may be also generally referred to as a compound related to (b) (methylol group-containing compound, alkoxy methyl group-containing compound or acyloxy methyl group-containing compound).

The abovementioned methylol group-containing compound related to (b) is obtained by heating the alkoxy methyl group-containing compound related to (b) in alcohol in the presence of an acidic catalyst such as hydrochloric acid, sulfuric acid, nitric acid and methane sulfonic acid. The above-mentioned acyloxy methyl group-containing compound related to (b) is obtained by mixing and stirring the methylol group-containing compound related to (b) with acyl chloride in the presence of a basic catalyst.

Specific examples of compounds related to (b) having the above-mentioned substituent include the following.

Examples of the melamine compound include hexamethylol melamine, hexamethoxymethyl melamine and a compound in which 1 to 5 methylol groups of hexamethylol melamine are methoxy-methylated or mixtures thereof. Examples of the melamine compound also include hexamethoxy ethyl melamine, hexaacyloxy methyl melamine and a compound in which 1 to 5 methylol groups of hexamethylol melamine are acyloxy-methylated or mixtures thereof.

Examples of the above-mentioned guanamine compound include tetramethylol guanamine, tetramethoxy methyl guanamine and compounds in which 1 to 3 methylol groups of tetramethylol guanamine are methoxy-methylated or mixtures thereof, and tetramethoxy ethyl guanamine, tetraacyloxy methyl guanamine and compounds in which 1 to 3 methylol groups of tetramethylol guanamine are acyloxy-methylated or mixtures thereof.

Examples of the above-mentioned glycol uryl compound include tetramethylol glycol uryl, tetramethoxy methyl glycol uryl and compounds in which 1 to 3 methylol groups of tetramethylol glycol uryl are methoxy-methylated or mixtures thereof, and compounds in which 1 to 3 methylol groups of tetramethylol glycol uryl are acyloxy-methylated or mixtures thereof.

Examples of the above-mentioned urea compound include tetramethylol urea, tetramethoxy methyl urea and compounds in which 1 to 3 methylol groups of tetramethylol urea are methoxy-methylated or mixtures thereof, and tetramethoxy ethyl urea.

These compounds related to (b) may be used alone, or may be used in combination.

The above-mentioned cross-linking agent (c), that is, a phenol compound, a naphthol compound or a hydroxy anthracene compound which is substituted by at least one group selected from the group consisting of a methylol group, an alkoxy methyl group and an acyloxy methyl group, makes it possible to prevent inter-mixing with the uppercoat photoresist through thermal cross-linking, and also to further improve the film strength in the same manner as the above-mentioned cross-linking agent (b).

Hereinafter, these compounds may be generally referred to as compounds related to (c) (methylol group-containing compound, alkoxy methyl group-containing compound or acyloxy methyl group-containing compound).

With respect to a number of the at least one group selected from a methylol group, an acyloxy methyl group, and an alkoxy methyl group contained in the above-mentioned cross-linking agent (c), two groups are required per molecule at a minimum. From the viewpoint of thermal cross-linking property and storage stability, it is preferable to use a compound in which all the second and fourth positions of the phenol skeleton are substituted. Moreover, in naphthol skeleton and hydroxy anthracene skeleton, it is preferable that all the ortho position and para position of the OH group are substituted. The third position and the fifth position of the phenol compound may be substituted or unsubstitued.

Regarding the above-mentioned naphthol compound, positions other than the ortho position of the OH group may be substituted or unsubstitued.

The methylol group-containing compound related to (c) is obtained from the reaction between a compound, in which ortho position or para position (second position or fourth position) of a phenolic OH group is a hydrogen atom, as a raw material and formalin in the presence of a basic catalyst, such as sodium hydroxide, potassium hydroxide, ammonia and tetraalkyl ammonium hydroxide.

The alkoxy methyl group-containing compound related to (c) is obtained by heating a methylol group-containing compound related to (c) in alcohol in the presence of an acidic catalyst such as hydrochloric acid, sulfuric acid, nitric acid, and methane sulfonic acid.

The acyloxy methyl group-containing compound related to (c) is obtained from the reaction of amethylol group-containing compound related to (c) with acyl chloride in the presence of a basic catalyst.

Examples of the skeleton compound in the cross-linking agent (c) include a phenol compound, naphthol and a hydroxy anthracene compound in which the ortho position or para position of the phenolic OH group is unsubstituted. Specific examples thereof include phenol, the isomers of cresol, 2,3-xylenol, 2,5-xylenol, 3,4-xylenol, 3,5-xylenol, bisphenols such as bisphenol A, 4,4'-bishydroxy biphenyl, Tris P-PA (manufactured by Honshu Chemical Industry Co., Ltd.), naphthol, dihydroxy naphthalene and 2,7-dihydroxy anthracene.

Examples of the cross-linking agent (c) include trimethylol phenol, tri(methoxymethyl)phenol and compounds in which 1 to 2 methylol groups of trimethylol phenol are methoxy-methylated, trimethylol-3-cresol, tri(methoxymethyl)-3-cresol, compounds in which 1 to 2 methylol groups of trimethylol-3-cresol are methoxy-methylated, dimethylol cresol such as 2,6-dimethylol-4-cresol, tetramethylol bisphenol A, tetramethoxy methyl bisphenol A, compounds in which 1 to 3 methylol groups of tetramethylol isphenol A are methoxy-methylated, tetramethylol-4,4'-bishydroxy biphenyl, tetramethoxymethyl-4,4'-bishydroxy biphenyl, hexamethylol form of Tris P-PA, hexamethoxymethyl form of Tris P-PA, compounds in which 1 to 5 methylol groups of hexamethmethylol form of Tris P-PA are methoxy-methylated and bishydroxy methyl naphthalene diol.

Moreover, examples of the hydroxy anthracene compound include 1,6-dihydroxymethyl-2,7-dihydroxy anthracene, etc.

Furthermore, examples of the acyloxymethyl group-containing compound include compounds in which a part or all of the methylol groups of the methylol group-containing compound are acyloxy-methylated.

Among these compounds, preferable compounds are trimethylol phenol, bishydroxymethyl-p-cresol, tetramethylol bisphenol A, a hexamethylol form of Tris P-PA (manufactured by Honshu Chemical Industry Co., Ltd.) and phenol compounds in which methylol groups of these compounds are substituted by alkoxymethyl groups or methylol and alkoxymethyl groups.

These compounds related to (c) may be used alone or in combination.

In the invention, it is not always necessary to contain the above-mentioned cross-linking agent. When across-linking agent is contained, the total content of the cross-linking agents (a) to (c) in the colorant-containing curable composition is preferably 1 to 70% by mass, more preferably 5 to 50% by mass, and most preferably 7 to 30% by mass, based on the solid component (mass) of the curable composition, although it depends on the kind of material.

(Polymerizable Compound)

A colorant-containing curable composition of the invention is preferable to contain at least one polymerizable compound (hereinafter, referred to as a monomer in some cases) The monomer may be added mainly in the case of obtaining a negative colorant-containing curable composition. Incidentally, the monomer may be added together with a photopolymerization initiator, which will be described later, to a positive-working type system containing a naphthoquinonediazide compound, which will also be described later, and in this case the hardness of formed patterns can be improved. Hereinafter, the polymerizable compounds will be described.

As the above-mentioned polymerizable compounds, compound having at least one addition polymerizable ethylene group and unsaturated ethylenic group and a boiling point of 100° C. or higher at a normal pressure are preferable. Examples of the compounds include monofunctional acrylates and methacrylates such as polyethyleneglycol mono (meth)acrylate, polypropyleneglycol mono(meth)acrylate, and phenoxyethyl (meth)acrylate; polyethyleneglycol di(meth)acrylate, trimethylolethane tri(meth)acrylate, neopentylglycol di(meth)acrylate, pentaerythritol tri(meth)acrylate, pentaerythritol tetra(meth)acrylate, dipentaerythritol penta(meth)acrylate, dipentaerythritol hexa(meth)acrylate, hexanediol (meth)acrylate, trimethylolpropane tri(acryloyloxypropyl) ether, tri(acryloyloxyethyl) isocyanurate, compounds obtained by adding ethylene oxide and propylene oxide to polyfunctional alcohols such as glycerin and trimethylolethane and then (meth)acrylating the obtained addition products; urethane acrylates described in JP-B Nos. 48-41708 and 50-6034 and JP-A No. 51-37193; polyester acrylates described in JP-A No. 48-64183 and JP-B Nos. 49-43191 and 52-30490; polyfunctional acrylates and methacrylates such as epoxyacrylates, which are reaction products of epoxy resins and (meth) acrylic acid; and mixtures of these compounds. Further, the examples may include photocurable monomers and oligomers described in Journal of Japanese Adhesive Association, vol. 20, No. 7, p. 300-308. Particularly (meth)acrylic ester type polymerizable compounds are preferable and tetra or higher functional (meth) acrylic ester type monomers are further preferable.

The content of the polymerizable compound in the colorant-containing curable composition is preferably 0.1 to 90% by mass, more preferably 1.0 to 80% by mass, and particularly preferably 2.0 to 70% by mass in the entire solid components of the composition.

(Radiosensitive Compound)

A colorant-containing curable composition of the invention is preferable to contain at least one radiosensitive compound. The radiosensitive compound in the invention may cause chemical reactions such as radical generation, acid generation, and base generation by radiation beam such as UV, deep UV, visible light, IR, electron beam and the like. The radiosensitive compound is used for insolubilizing the above-mentioned alkali-soluble resins by cross-linking, polymerization, or acidic group decomposition reactions, or making a formed layer insoluble by causing polymerization of the polymerizable monomers or oligomers or cross-linking the cross-linking agents existing in the layer.

When constituting the colorant-containing curable composition into a negative-working type structure, the composition is preferable to contain a photopolymerization initiator. When constituting the composition into a positive-working type structure, the composition is preferable to contain a naphthoquinonediazide compound.

The photopolymerization initiator to be used for producing a negative type composition will be described. The photopolymerization initiator is not particularly limited as long as it can cause polymerization reaction of the above-mentioned polymerizable compounds (monomers having polymerizable groups) and is preferably selected from the group consisting of a viewpoint of characteristics, initiating efficiency, absorption wavelength, availability, and the cost. The photopolymerization initiator may be added to the above-mentioned positive type composition containing naphthoquinonediazido compound and in this case, the hardness of the patterns to be formed can be improved further.

Examples of the photopolymerization initiator may include trihalomethyltriazine compounds, benzyl dimethyl ketal compounds, α-hydroxyketone compounds, α-aminoketone compounds, phosphine oxide compounds, metallocene compounds, oxime compounds, triallylimidazole dimers, benzothiazole type compounds, benzophenone compounds, acetophenone compounds and derivatives thereof, cyclopentadiene-benzene-iron complexes and salts thereof, halomethyloxadiazole compounds, 3-aryl-substituted cumarin compounds and the like.

Examples of the active halogen compound that is a halomethyl oxadiazole compound include a 2-halomethyl-5-vinyl-1,3,4-oxadiazole compound and the like, described in JP-B No. 57-6096, 2-trichloromethyl-5-styryl-1,3,4-oxadiazole, 2-trichloromethyl-5-(p-cyanostyryl)-1,3,4-oxadiazole, 2-trichloromethyl-5-(p-methoxystyryl)-1,3,4-oxadiazole.

Examples of the active halogen compound that is a halomethyl-s-triazine compound include a vinyl-halomethyl-s-triazine compound disclosed in JP-B No. 59-1281, a 2-(naphtho-1-yl)-4,6-bis-halomethyl-s-triazine compound and a 4-(p-aminophenyl)-2,6-di-hallomethyl-s-triazine compound, described in JP-A No. 53-133428.

Specific examples include 2,4-bis(trichloromethyl)-6-p-methoxystyryl-s-triazine, 2,6-bis(trichloromethyl)-4-(3,4-methyleneoxy phenyl)-1,3,5-triazine, 2,6-bis(trichloromethyl)-4-(4-methoxyphenyl)-1,3,5-triazine, 2,4-bis(trichloromethyl)-6-(1-p-dimethylaminophenyl-1,3-butadienyl)-s-triazine, 2-trichloromethyl-4-amino-6-p-methoxystyryl-s-triazine, 2-(naphtho-1-yl)-4,6-bis-trichloromethyl-s-triazine, 2-(4-methoxy-naphtho-1-yl)-4,6-bis-trichloromethyl-s-triazine, 2-(4-methoxy-naphtho-1-yl)-4,6-bis-trichloromethyl-s-triazine, 2-(4-ethoxy-naphtho-1-yl)-4,6-bis-trichloromethyl-s-triazine, 2-(4-butoxy-naphtho-1-yl)-4,6-bis-trichloromethyl-s-triazine, 2-[4-(2-methoxyethyl)-naphtho-1-yl]-4,6-bis-trichloromethyl-s-triazine, 2-[4-(2-ethoxyethyl)-naphtho-1-yl]-4,6-bis-trichloromethyl-s-triazine, 2-[4-(2-butoxyethyl)-naphtho-1-yl]-4,6-bis-trichloromethyl-s-triazine, 2-(2-methoxy-naphtho-1-yl)-4,6-bis-trichloromethyl-s-triazine, 2-(6-methoxy-5-methyl-naphtho-2-yl)-4,6-bis-trichloromethyl-s-triazine, 2-(6-methoxy-naphtho-2-yl)-4,6-bis-trichloromethyl-s-triazine, 2-(5-methoxy-naphtho-1-yl)-4,6-bis-trichloromethyl-s-triazine, 2-(4,7-dimethoxy-naphtho-1-yl)-4,6-bis-trichloromethyl-s-triazine, 2-(6-ethoxy-naphtho-2-yl)-4,6-bis-trichloromethyl-s-triazine, 2-(4,5-dimethoxy-naphtho-1-yl)-4,6-bis-trichloromethyl-s-triazine, 4-[p-N,N-di(ethoxycarbonylmethyl) aminophenyl]-2,6-di(trichloromethyl)-s-triazine, 4-[o-methyl-p-N,N-di(ethoxycarbonylmethyl) aminophenyl]-2,6-di(trichloromethyl)-s-triazine, 4-[p-N,N-di(chloroethyl) aminophenyl]-2,6-di(trichloromethyl)-s-triazine, 4-[o-methyl-p-N,N-di(chloroethyl) aminophenyl]-2,6-di(trichloromethyl)-s-triazine, 4-(p-N-chloroethyl aminophenyl)-2,6-di(trichloromethyl)-s-triazine, 4-(p-N-ethoxycarbonylmethyl aminophenyl)-2,6-di(trichloromethyl)-s-triazine, 4-[p-N,N-di(phenyl) aminophenyl]-2,6-di(trichloromethyl)-s-triazine, 4-(p-N-chloroethylcarbonyl aminophenyl)-2,6-di(trichloromethyl)-s-triazine, 4-[p-N-(p-methoxyphenyl) carbonylaminophenyl]-2,6-di(trichloromethyl)-s-triazine, 4-[m-N,N-di(ethoxycarbonylmethyl) aminophenyl]-2,6-di(trichloromethyl)-s-triazine, 4-[m-bromo-p-N,N-di(ethoxycarbonylmethyl) aminophenyl]-2,6-di(trichloromethyl)-s-triazine, 4-[m-chloro-p-N,N-di(ethoxycarbonyl methyl) aminophenyl]-2,6-di(trichloromethyl)-s-triazine, 4-[m-fluoro-p-N,N-di(ethoxycarbonylmethyl) aminophenyl]-2,6-di(trichloromethyl)-s-triazine, 4-[o-bromo-p-N,N-di(ethoxycarbonylmethyl) aminophenyl]-2,6-di(trichloromethyl)-s-triazine, 4-[o-chloro-p-N,N-di(ethoxycarbonylmethyl) aminophenyl]-2,6-di(trichloromethyl)-s-triazine, 4-[o-fluoro-p-N,N-di(ethoxycarbonylmethyl) aminophenyl]-2,6-di(trichloromethyl)-s-triazine, 4-[o-bromo-p-N,N-di(chloroethyl) aminophenyl]-2,6-di(trichloromethyl)-s-triazine, 4-[o-chloro-p-N,N-di(trichloroethyl) aminophenyl]-2,6-di(trichloromethyl)-s-triazine, 4-[o-fluoro-p-N,N-di(chloroethyl) aminophenyl]-2,6-di(trichloromethyl)-s-triazine, 4-[m-bromo-p-N,N-di(chloromethyl) aminophenyl]-2,6-di(trichloromethyl)-s-triazine, 4-[m-chloro-p-N,N-di(chloroethyl) aminophenyl]-2,6-di(trichloromethyl)-s-triazine, 4-[m-fluoro-p-N,N-di(chloromethyl) aminophenyl]-2,6-di(trichloromethyl)-s-triazine, 4-(m-bromo-p-N-ethoxycarbonylmethyl aminophenyl)-2,6-di(trichloromethyl)-s-triazine, 4-(m-chloro-p-N-ethoxycarbonylmethyl aminophenyl)-2,6-di(trichloromethyl)-s-triazine, 4-(m-fluoro-p-N-ethoxycarbonylmethyl aminophenyl)-2,6-di(trichloromethyl)-s-triazine, 4-(o-bromo-p-N-ethoxycarbonylmethyl aminophenyl)-2,6-di(trichloromethyl)-s-triazine, 4-(o-chloro-p-N-ethoxycarbonylmethyl aminophenyl)-2,6-di(trichloromethyl)-s-triazine, 4-(o-fluoro-p-N-ethoxycarbonylmethyl aminophenyl)-2,6-di(trichloromethyl)-s-triazine, 4-(m-bromo-p-N-chloroethyl aminophenyl)-2,6-di(trichloromethyl)-s-triazine, 4-(m-chloro-p-N-chloroethyl aminophenyl)-2,6-di(trichloromethyl)-s-triazine, 4-(m-fluoro-p-N-chloroethyl aminophenyl)-2,6-di(trichloromethyl)-s-triazine, 4-(o-bromo-p-N-chloroethyl aminophenyl)-2,6-di(trichloromethyl)-s-triazine, 4-(o-chloro-p-N-chloroethyl aminophenyl)-2,6-di(trichloromethyl)-s-triazine, 4-(o-fluoro-p-N-chloroethyl aminophenyl)-2,6-di(trichloromethyl)-s-triazine.

In addition to these, the following compounds are desirably used: TAZ series manufactured by Midori Kagaku Co., Ltd. (for example, TAZ-107, TAZ-110, TAZ-104, TAZ-109, TAZ-140, TAZ-204, TAZ-113, and TAZ-123), T series manufactured by PANCHIM Co., Ltd. (for example, T-OMS, T-BMP, T-R, and T-B), Irgacure series manufactured by Ciba-Geigy, Corp. (for example, Irgacure 651, Irgacure 184, Irgacure 500, Irgacure 1000, Irgacure 149, Irgacure 819, and Irgacure 261), Darocur series (for example, Darocur 1173), 4,4'-bis(diethylamino)-benzophenone, 2-(O-benzoyloxime)-1-[4-(phenylthio) phenyl]-1,2-octane dion, 2-benzyl-2-dimethylamino-4-morpholinobutyrophenone, 2,2-dimethoxy-2-phenyl acetophenone, 2-(o-chlorophenyl)-4,5-diphenylimidazolyl dimer, 2-(o-fluorophenyl)-4,5-diphenylimidazolyl dimer, 2-(o-methoxyphenyl)-4,5-diphenylimidazolyl dimer, 2-(p-methoxyphenyl)-4,5-diphenylimidazolyl dimer, 2-(p-dimethoxyphenyl)-4,5-diphenylimidazolyl dimer, 2-( 2,4-dimethoxyphenyl)-4,5-diphenylimidazolyl dimer, 2-(p-methylmercaptophenyl)-4,5-diphenylimidazolyl dimer and benzoin isopropyl ether.

Further, as the α-aminoketone type compounds, examples of the compounds include Irgacure series (e.g. Irgacure 907 and Irgacure 369) manufactured by Ciba-Geigy Corp., 2-methyl-1-phenyl-2-morpholinopropan-1-one, 2-methyl-1-[ 4-(hexyl)phenyl]-2-morpholinopropan-1-one, and 2-ethyl-2-dimethylamino-1-(4-morpholinophenyl)butan-1-one.

The oxime type compounds are not particularly limited and include 2-(O-benzoyloxime)-1-[4-(phenylthio)phenyl]-1,2-octanedione, 1-(4-methylsulfanylphenyl)-butane-1,2-butane-2-oxime-O-acetate, 1-(4-methylsulfanylphenyl)-butane-1-one-oxime-O-acetate, hydroxyimino-(4-methylsulfanylphenyl)-ethyl acetate-O-acetate, and hydroxyimino-( 4-methylsulfanylphenyl)-ethyl acetate-O-benzoate.

From a viewpoint of availability and stability, preferable compounds include Irgacure 651 as the benzyl methyl ketal compound; Irgacure 184, 1173, 500, 1000, and 2959 as the α-hydroxyketone compound; Irgacure 907 and 369 as the α-aminoketone compound; Irgacure 1700, 149, 1850, 819, and 184 as the phosphine oxide compound; and Irgacure 784 and 261 as the metallocene compound (all manufactured by Ciba Specialty Chemicals Inc.) and also, analogous compounds and/or peripheral compounds of them are also preferable.

Among them, a compound which does not generate acids due to decomposition is preferably used in terms of light fastness and heat resistance of a dye. That is, the compound which does not generate acids due to decomposition among the above exemplified compounds is preferably at least one compound selected from the group consisting of benzyl dimethyl ketal compounds, α-hydroxyketone compounds, α-aminoketone compounds, phosphine oxide compounds, metallocene compounds, oxime compounds, triallylimidazole dimers, benzothiazole type compounds, benzophenone compounds, acetophenone compounds and derivatives thereof, cyclopentadiene-benzene-iron complex and its salt. More preferably, the compound is at least one compound selected from the group consisting of α-aminoketone compounds, phosphine oxide compounds, metallocene compounds, oxime compounds, and triallylimidazole dimers.

These photo-polymerization initiator may be used in combination with a sensitizer and a photo-stabilizer.

Specific examples of these include benzoin, benzoin methyl ether, 9-fluorenone, 2-chloro-9-fluorenone, 2-methyl-9-fluorenone, 9-anthrone, 2-bromo-9-anthrone, 2-ethyl-9-anthrone, 9,10-anthraquinone, 2-ethyl-9,10-anthraquinone, 2-t-butyl-9,10-anthraquinone, 2,6-dichloro-9,10-anthraquinone, xanthone, 2-methylxanthone, 2-methoxyxanthone, 2-ethoxyxanthone, thioxanthone, 2,4-diethylthioxanthone, acridone, 10-butyl-2-chloroacridone, benzyl, dibenzyl acetone, p-(dimethylamino) phenylstyryl ketone, p-(dimethylamino) phenyl-p-methylstyryl ketone, benzophenone, p-(dimethylamino) benzophenone (or Michler's ketone), p-(diethylamino) benzophenone, benzoanthrone, benzothiazole type compounds and the like described in JP-B No. 51-48516, and Tinuvin 1130 and Tinuvin 400.

In addition to the above-mentioned photo-polymerization initiator, other known initiators may be used in the colorant-containing curable composition of the invention.

Specific examples thereof include a vicinal polyketol aldonil compound disclosed in U.S. Pat. No. 2,367,660; an α-carbonyl compound disclosed in U.S. Pat. Nos. 2,367,661 and 2,367,670; acyloin ether disclosed in U.S. Pat. No. 2,448,828; an α-hydrocarbon-substituted aromatic acyloin compound disclosed in U.S. Pat. No. 2,722,512; a polynuclear quinone compound disclosed in U.S. Pat. Nos. 3,046,127 and 2,951,758, a combination of triallylimidazole dimer/p-aminophenyl ketone disclosed in U.S. Pat. No. 3,549,367; and a combination of benzothiazole type compound/trihalomethyl-s-triazine compound disclosed in JP-B No. 51-48516.

The total amount of use of a photo-polymerization initiator is from 0.01 to 50% by mass, preferably from 1 to 30% by mass, and most preferably from 1 to 20% by mass, based on the solid content (mass) of polimerizable compound (monomers) If the amount of an initiator is less than 0.01% by mass, polymerization is reluctant to progress. If it exceeds 50% by mass, though polymerization rate increases, the molecular weight may become low and film strength may become weak.

In addition to the above, it is further preferred that a thermal polymerization inhibitor is added to the colorant-containing curable composition of the invention. Examples of the thermal polymerization inhibitor include hydroquinone, p-methoxyphenol, di-t-butyl-p-cresol, pyrogallol, t-butyl catechol, benzoquinone, 4,4'-thiobis( 3-methyl-6-t-butylphenol), 2,2'-methylenebis(4-methyl-6-t-butylphenol), 2-mercaptobenzimidazole, etc. Next, naphthoquinonediazido compounds which is useful when constituting the colorant-containing curable compositions into a positive-working type structure will be described. The naphthoqinonediazido compuonds are compounds having at least one o-quinonediazido group. Examples of the compounds include o-naphthoquinonediazido-5-sulfonic acid ester, o-naphthoquinonediazido-5-sulfonic acid amide, o-naphthoquinonediazido-4-sulfonic acid ester, and o-naphthoquinonediazido-4-sulfonic acid amide. These esters and amide compounds can be produced from phenol compounds represented by the general formula (I) by known methods in JP-A Nos. 2-84650 and 3-49437.

Further, when constituting the colorant-containing curable compositions into a positive-working type structure, in general, the above-mentioned alkali-soluble phenol resins and the above-mentioned cross-linking agents are preferably dissolved in organic solvent at ratios of 2 to 50% by mass and 2 to 30% by mass, respectively. Also, the contents of the above-mentioned naphthoqinonediazido compounds and the colorants in the solutions containing the binders and the cross-linking agents are preferably 2 to 30% by mass and 2 to 50% by mass, respectively.

(Organic Solvent)

At the time of producing a colorant-containing curable composition of the invention, an organic solvent (referred to as solvent in some cases in this specification) is generally added. Basically, the solvent is not particularly limited as long as it satisfies the solubility of the respective components and coatability of the colorant-containing curable composition and it is preferable to be selected in consideration of the solubility of a colorant and a binder, coatability, and safety.

Preferable examples of the above-mentioned solvent include esters such as ethyl acetate, n-butyl acetate, isobutyl acetate, amyl formate, isoamyl acetate, isobutyl acetate, butyl propionate, isopropyl butyrate, ethyl butyrate, and butyl butyrate; alkyl esters such as methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, and ethyl ethoxyacetate; 3-oxypropoionic acid alkyl esters such as methyl 3-oxypropoionate, ethyl 3-oxypropoionate, methyl 3-methoxypropionate, ethyl 3-methoxypropionate, methyl 3-ethoxypropionate, and ethyl 3-ethoxypropionate; 2-oxypropoionic acid alkyl esters such as methyl 2-oxypropoionate, ethyl 2-oxypropoionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methoxypropionate, ethyl 2-oxy-2-methoxypropionate, methyl 2-methoxy-2-methoxypropionate, and ethyl 2-ethoxy-2-methoxypropionate; methylpyruvate, ethyl pyruvate, propyl pyruvate, methyl acetoacetate, ethyl acetoacetate, methyl 2-oxobutanate, and ethyl 2-oxobutanate; esters such as diethylene glycol dimethyl ether, tetrahydrofuran, ethylene glycol monomethyl ether, ethylene glycol monoethyl ether, methylcellosolve acetate, ethylcellosolve acetate, diethylene glycol monomethyl ether, diethylene glycol monoethyl ether, diethylene glycol monobutyl ether, propylene glycol methyl ether, propylene glycol methyl ether acetate, propylene glycol ethyl ether acetate, and propylene glycol propyl ether acetate; ketones such as methyl ethyl ketone, cyclohexanone, 2-butanone, and 3-heptanone; aromatic hydrocarbons such as toluene and xylene.

Among them, more preferable solvents include methyl 3-ethoxypropionate, ethyl 3-ethoxypropionate, ethylcellosolve acetate, ethyl lactate, diethylene glycol dimethyl ether, butyl acetate, methyl 3-methoxypropionate, 2-heptanone, cyclohexanone, ethyl carbitol acetate, butyl carbitol acetate, propylene glycol methyl ether, and propylene glycol methyl ether acetate.

(Various Additives)

The colorant-containing curable composition of the invention, if necessary, may contain various additives such as a filler, apolymer compound other than polymers mentioned above, a surfactant, an adhesion promoting agent, an anti-oxidant, an UV absorbent, an agglomeration preventing agent and the like.

Specific examples of these additives are a filler such as glass and alumina; polymer compound such as such as poly(vinyl alcohol), poly(acrylic acid), polyethylene glycol monoalkyl ether, and polyfluoroalkyl acrylate other than a binder resin; nonionic, cationic, and anionic surfactants; an adhesion promoting agent such as vinyltrimethoxysilane, vinyltriethoxysilane, vinyltris(2-methoxyethoxy)silane, N-(2-aminoethyl)-3-aminopropylmethyldimethoxysilane, N-(2-aminoethyl)₃-aminopropyltrimethoxylsilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxylsilane, 3-chloropropylmethyldimethoxysilane, 3-chloropropyltrimethoxysilane, 3-methacryloxypropyltrimethoxysilane, and 3-mercaptopropyltrimethoxysilae; an anti-oxidants such as 2,2-thiobis(4-methyl-6-tert-butylphenol), and 2,6-di-tert-butylphenol; an UV absorbents such as 2-(3-tert-butyl-5-methyl-2-hydroxyphenyl)-5-chlorobenzotriazole and alkoxybenzophenone; and agglomeration preventing agents such as sodium polyacrylate.

Further, an organic carboxylic acid, preferably a low molecular weight organic carboxylic acid having a molecular weight of 1,000 or less, can be added to the colorant-containing curable composition of the invention for the purpose of accelerating dissolution of the non-image portion to alkali and further improving the developing property of the colorant-containing curable composition.

Specific examples of the organic carboxylic acid include aliphaticmonocarboxylic acids such as formic acid, acetic acid, propionic acid, butyric acid, valeric acid, pivalic acid, caproic acid, diethyl acetate, enanthic acid and capric acid; aliphatic dicarboxylic acids such as oxalic acid, malonic acid, succinic acid, glutaric acid, adipic acid, pimellic acid, suberic acid, azelaic acid, sebacic acid, brassylic acid, methylmalonic acid, ethylmalonic acid, dimethylmalonic acid, methylsuccinic acid, tetramethylsuccinic acid, and citraconic acid; aliphatic tricarboxylic acids such as tricarballylic acid, aconitic acid, and camphoronic acid; aromatic monocarboxylic acids such as benzoic acid, toluic acid, cuminic acid, hemellitic acid, and mesitylenic acid; aromatic polycarboxylic acids such as phthalic acid, isophthalic acid, terephthalic acid, trimellitic acid, trimesitylenic acid, mellophanic acid, and pyromellitic acid; other carboxylic acids such as phenyl acetate, hydratropic acid, hydrocinnamic acid, mandelic acid, phenylsuccinic acid, atropic acid, cinnamic acid, methyl cinnamate, benzyl cinnamate, cinnamylideneacetic acid, coumaric acid, and umbellic acid.

A colorant-containing curable composition of the invention is useful for forming color images for a color filter to be used for a liquid crystal display device (LCD) and a solid state image pickup device (e.g. CCD and CMOS) and a color filter for electroluminescence and also preferably used for producing printing ink, ink for ink jet prating, and paint.

<Color Filter and Its Production>

Next, a color filter of the invention will be described along with a production method of the filter.

In a production method of the color filter of the invention, the above-mentioned colorant-containing curable composition of the invention is used.

When the colorant-containing curable composition of the invention is constituted into a negative-working type structure, the negative type colorant-containing curable composition is applied onto a support by a coating method such as spin coating, flowing, or roller coating to form a radiosensitive composition layer. The coated layer is exposed through a prescribed mask pattern and developed with a developer to form a negative-working type color pattern (image formation step). In this case, if necessary, a curing step of curing the color pattern by heating and/or exposure.

When the colorant-containing curable composition of the invention is constituted into a positive-working type structure, the positive type colorant-containing curable composition is applied onto a support by an optional coating method such as spin coating, flowing, or roller coating to form a radiosensitive composition layer and the layer is exposed through a prescribed mask pattern and developed with a developer solution to form a positive type color pattern (image formation step) and then the color pattern is cured by post baking.

In the color filter production, in the case of the negative type, the image formation step (and if necessary, the curing step) is repeated proper times corresponding to the number of the desired hues and in the case of the positive type, the image formation step and post baking step are repeated proper times corresponding to the number of the desired hues to obtain a color filter.

In this case, the light or radiation beam to be employed is preferably UV ray such as g-ray, h-ray, and i-ray.

Examples of the above-mentioned support include soda glass, Pyrex (R) glass, quartz glass, and these glasses having a transparent conductive film bonded thereon, which may be used in liquid crystal display devices and the like. Examples of the support also include photoelectric conversion device substrates used for image pickup devices and the like, for instance, silicon substrates, complementary metal oxide film semiconductors (CMOS) and the like. In some cases such a support may have thereon a black stripe that is used for separating each pixel.

Moreover, an undercoat layer may be formed on the support, if necessary, in order to improve the adhesion with an upper layer, to prevent substance dispersion or to flatten the substrate surface.

As the above-mentioned developer, any developer may be used as long as it dissolves uncured portions of the colorant-containing curable composition of the invention without dissolving cured portions. Specific examples thereof include various kinds of combinations of organic solvents and alkaline aqueous solutions. The organic solvents include the above-mentioned solvents to be used upon preparing the dye-containing curable composition of the invention.

The above-mentioned aqueous alkaline solution may be prepared by dissolving alkaline compounds such as sodium hydroxide, potassium hydroxide, sodium carbonate, sodium silicate, sodium metasilicate, aqueous ammonia, ethylamine, diethylamine, dimethylethanolamine, tetramethylammonium hydroxide, tetraethylammonium hydroxide, choline, pyrrole, piperidine, and 1,8-diazabicyclo[5,4,0]-7-undecene. These alkaline compounds are preferably dissolved at a concentration of 0.001 to 10% by mass, and more preferably 0.01 to 1% by mass. When a developer comprising such an alkaline aqueous solution is used, the color filter is, in general, washed with water after development.

A color filter of the invention can be used for liquid crystal display devices and solid state image pickup devices such as CCD and particularly suitable for CCD devices and CMOS devices having 1,000,000 or more pixels with high image resolution. The color filter of the invention may be used as a color filter to be installed between a light reception part of each pixel composing a CCD and a microlens for condensing light.

EXAMPLES

The present invention will be described more specifically with reference to Examples, however it is not intended that the invention be limited to those Examples. Modifications and substitutions to specific process conditions and structures can be made without departing from the spirit and scope of the invention. Without any specific remark, "part" means parts by weight.

1) Synthesis of Azo Compound (Synthesis 1): Synthesis of Example Compound (1)

Along with the following scheme, an azo compound of the invention was synthesized.

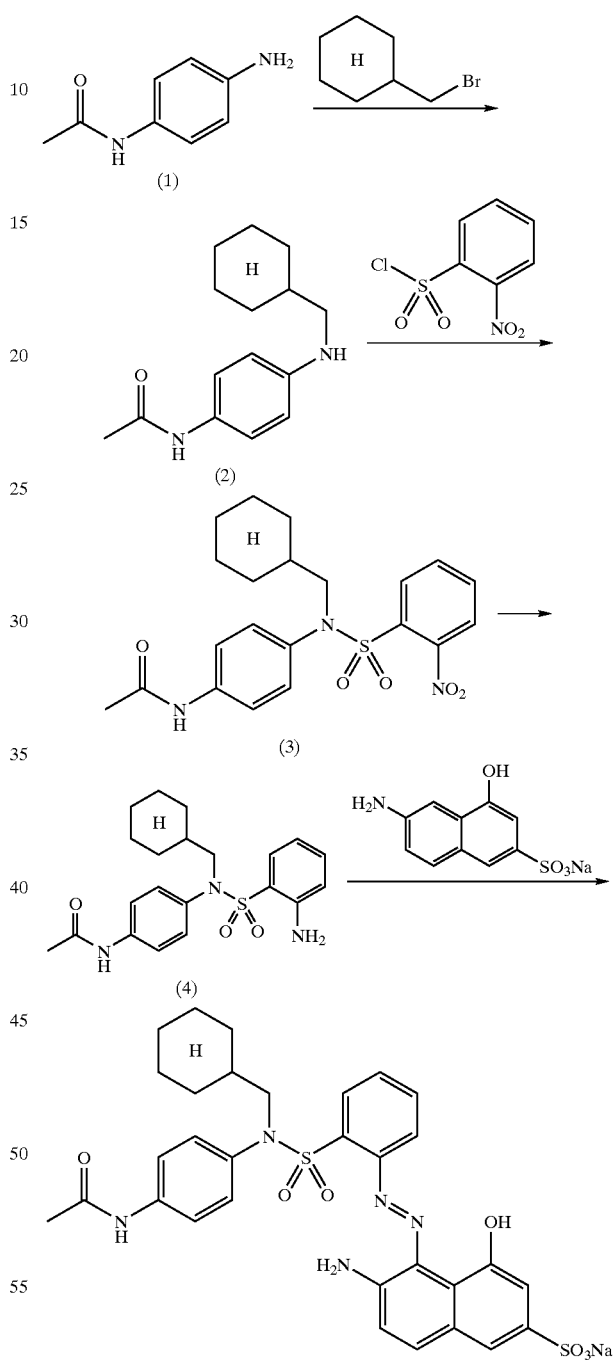

The foregoing compound (1) 7.00 g, cycloehxylmethyl bromide 8.54 g, dimethylformamide (DMF) 20 g, and triethylamine 4.72 g were mixed and stirred at 50° C. for 6 hours. The reaction mixture was poured into water and extracted with ethyl acetate and the obtained ethyl acetate phase was washed with water several times. Magnesium sulfate and activated carbon were added to the ethyl acetate phase for drying and decoloration and filtered with sellaite.

The resulting ethyl acetate phase was concentrated and recrystallized from hexane/ethyl acetate to obtain a compound (2) 6.83 g (yield 59.6%).

Next, o-nitrobenzenesulfonyl chloride 5.01 g was mixed with and dissolved in acetone 30 ml and the obtained compound (2) 5.73 g was gradually added to the solution. After the obtained mixture was heated to 50° C., an aqueous solution of 20% sodium carbonate 8.22 g was dropwise added. The mixture was stirred for 1 hour after the dropwise addition, heated to 70° C., and again stirred further for 1 hour. The reaction mixture was poured to water and extracted with ethyl acetate and the obtained ethyl acetate phase was washed with an aqueous solution of 4% sulfuric acid. Magnesium sulfate and activated carbon were added to the resulting ethyl acetate phase for drying and decoloration and filtered with sellaite. The obtained ethyl acetate phase was concentrated to obtain a compound (3) 8.5 g (yield 87%).

Successively, reduced iron 3.8 g, acetic acid 2.4 g, and water 7.2 g were mixed and stirred at 80° C. and then, a dichlorobenzene solution of the obtained compound (3) 8.5 g was dropwise added to the solution and stirred 80° C. for 2 hours. Further, sodium carbonate 1.39 g was added and stirred at 80° C. for 30 minutes. The resulting reaction mixture was then mixed with sellaite and activated carbon and filtered by sellaite and after that, the organic layer was steam distillated to obtain a compound (4) 6.16 g (yield 78%).

Next, the obtained compound (4) 3.32 g, tetraethylammonium chloride 0.08 g, acetic acid 2.5 ml and 36% hydrochloric acid 3.8 ml were mixed and cooled to 0° C. An aqueous sodium nitrite solution (NaNO2: 0.58 g, water: 1.7 g) was dropwise added to the mixture while the inner temperature was kept at 5° C. or lower. After that, the obtained mixture was stirred for 3 hours while being kept at 5 to 10° C. (a diazo solution). The diazo solution was dropwise added to a separately prepared aqueous alkaline solution of y-acid (y-acid: 2.11 g, water: 16.5 g, NaOH: 0.35 g) at 0° C. in 30 minutes. Next, after an aqueous solution of 40% sodium acetate 5 ml was dropwise added in 1 hour, the obtained reaction mixture was stirred at 0° C. for 2 hours. Successively, an aqueous solution of 10% sodium carbonate 20 ml was dropwise added and the obtained reaction mixture was stirred overnight. Then, further, an aqueous solution of 50% NaOH 7.0 g was dropwise added, heated to 65° C., and stirred for 1 hour and then cooled to a room temperature. The obtained mixture was filtered and washed with alkaline salt water to obtain an aimed azo compound [Example compound (1)] 4.3 g (yield 77%).

The azo compound obtained in the above-mentioned manner was subjected to structure analysis by NMR to find as follows:

$^1$H-NMR (300 MHz, solvent: dimethyl-$d_6$sulfoxide, standard substance: tetramethylsilane) δ12.5 ppm (1H, s), 10.65 ppm (1H, br.s), 9.83 ppm (1H, s), 8.90 (1H, br.s), 8.0–7.8 (3H, m), 7.58 (2H, d), 7.50 (1H, t), 7.38 (2H, d), 7.22 (1H, s), 7.05 (1H, d), 6.90 (2H, d), 3.28 (2H, d), 1.87 (3H, s), 1.60–1.40 (5H, m), 1,20–0.85 (4H, m), 0.85–0.60 (2H, m).

(Synthesis 2): Synthesis of Example Compound (2)

An azo compound [example compound (2)] was obtained in the same synthesis manner as the synthesis 1, except p-(ethylamino)acetanilide was used in place of the compound (2) in the synthesis 1 and similarly subjected to the structure analysis by NMR to find as follows:

$^1$H-NMR (300 MHz, solvent: dimethyl-$d_6$sulfoxide, standard substance: tetramethylsilane) δ12.52 ppm (1H, s), 10.60 ppm (1H, br.s), 9.73 ppm (1H, s), 8.76 (1H, br.s), 7.90–7.78 (3H, m), 7.60–7.42 (3H, m), 7.35 (2H, d), 7.22 (1H, s), 7.05 (1H, d), 6.99 (1H, d), 6.85 (2H, d), 3.55 (2H, q), 1.85 (3H, s), 0.85 (3H, t).

(Synthesis 3): Synthesis of Example Compound (3)

An azo compound [example compound (3)] was obtained in the same synthesis manner as the synthesis 1, except p-(N-n-hexylamino)acetanilide was used in place of the compound (2) in the synthesis 1 and similarly subjected to the structure analysis by NMR to find as follows:

$^1$H-NMR (300 MHz, solvent: dimethyl-$d_6$sulfoxide, standard substance: tetramethylsilane) δ12.49 ppm (1H, s), 10.65 ppm (1H, br.s), 9.72 ppm (1H, s), 8.80 (1H, br.s), 7.90–7.78 (3H, m), 7.60–7.40 (3H, m), 7.34 (2H, d), 7.22 (1H, s), 7.00 (1H, d), 6.85 (2H, d), 3.45 (2H, t), 1.87 (3H, s), 1.25–0.90 (8H, m), 0.70 (3H, t).

(Synthesis 4): Synthesis of Example Compound (11)

An azo compound [example compound (11)] was obtained in the same synthesis manner as the synthesis 1, except N-ethyl-p-( 2-chloroethylcarbonylamino)aniline was used in place of the compound (2) in the synthesis 1 and similarly subjected to the structure analysis by NMR to find as follows:

$^1$H-NMR (300 MHz, solvent: dimethyl-$d_6$sulfoxide, standard substance: tetramethylsilane) δ12.52 ppm (1H, s), 10.60 ppm (1H, br.s), 9.73 ppm (1H, s), 8.76 (1H, br.s), 7.90–7.78 (3H, m), 7.60–7.42 (3H, m), 7.35 (2H, d), 7.22 (1H, s), 7.05 (1H, d), 6.99 (1H, d), 6.85 (2H, d), 3.77 (2H, t), 3.55 (2H, q), 2.60 (2H, t), 0.85 (3H, t).

(Synthesis 5): Synthesis of Example Compound (29)

An azo compound [example compound (29)] was obtained by mixing the azo compound of the synthesis 2 and morpholine in equivalent amounts, dissolving the mixture in a mixed solvent of methanol and water, removing the solvent by distillation after the dissolution, and drying the obtained product under reduced pressure and the azo compound was similarly subjected to the structure analysis by NMR to find as follows:

$^1$H-NMR (300 MHz, solvent: dimethyl-$d_6$sulfoxide, standard substance: tetramethylsilane) δ12.52 ppm (1H, s), 10.60 ppm (1H, br.s), 9.73 ppm (1H, s), 8.76 (1H, br.s), 7.90–7.78 (3H, m), 7.60–7.42 (3H, m), 7.35 (2H, d), 7.22 (1H, s), 7.05 (1H, d), 6.99 (1H, d), 6.85 (2H, d), 3.60 (4H, t), 3.55 (2H, q), 2.80 (4H, t), 1.85 (3H, s), 0.85 (3H, t).

(Synthesis 6): Synthesis of Example Compound (4)

An azo compound [example compound (4)] was obtained in the same synthesis manner as the synthesis 1, except N-( 4-N-ethylaminobenzyl)acetamide was used in place of the compound (2) in the synthesis 1 and similarly subjected to the structure analysis by NMR to find as follows:

$^1$H-NMR (300 MHz, solvent: dimethyl-$d_6$sulfoxide, standard substance: tetramethylsilane) δ12.52 ppm (1H, s), 10.60 ppm (1H, br.s), 9.73 ppm (1H, s), 8.76 (1H, br.s), 7.90–7.78 (3H, m), 7.60–7.42 (3H, m), 7.35 (2H, d), 7.22 (1H, s), 7.05 (1H, d), 6.99 (1H, d), 6.85 (2H, d), 3.95 (2H, s), 3.55 (2H, q), 1.85 (3H, s), 0.85 (3H, t).

2) Preparation of Resist Solution

| | |
|---|---|
| propylene glycol monomethyl ether acetate (PGMEA) | 19.20 parts |
| ethyl lactate | 36.67 parts |
| binder [PGMEA solution of 41% allyl methacrylate/ methacrylic acid copolymer (mole ratio = 75:25)] | 30.51 parts |

-continued

| | |
|---|---|
| Dipentaerythritol hexaacrylate | 12.20 parts |
| polymerization inhibitor (p-methoxyphenol) | 0.0061 parts |
| fluoro type surfactant (F-475 manufactured by Dainippon Ink and Chemicals, Inc.) | 0.83 parts |
| photopolymerization initiator [2-(O-benzoyloxime)-1-[4-(phenylthio)phenyl]-1,2-actanedione] | 0.586 parts | were mixed and dissolved to obtain a resist solution.

3) Production of Glass Substrate Coated with Undercoat Layer

After a glass substrate (Corning 1737) was washed with an aqueous 0.1% NaOH solution under ultrasonic wave, the substrate was washed with water and baked for dehydration (200° C./30 minutes). Next, the obtained resist solution as described in 2) was applied to the washed glass substrate to form a 2 μm-thick coating by a spin coater and the coating was dried at 200° C. for 1 hour to form a cured coating (an undercoat layer).

4) Preparation of Colorant-Containing Resist Solution

The resist solution obtained as described in 2) 9.4 parts and the above synthesized example compound (1) [an azo compound represented by the general formula (I)] 0.6 parts were mixed and dissolved to obtain a colorant-containing resist solution (a colorant-containing curable composition of the invention)

5) Exposure and Development of Colorant-Containing Curable Composition (Image Formation Process)

The colorant-containing resist solution obtained as described in 4) was applied in a thickness of 1.0 μm to the undercoat layer of the undercoat layer-bearing glass substrate obtained as described in 3) by using a spin coater and pre-baked at 120° C. for 120 seconds.

Next, using an exposure apparatus, the coating layer was exposed to light with 365 nm wavelength and 800 mJ/cm² exposure dose through a 20 μm mask. After the light radiation, development was carried out at 26° C. for 60 seconds with 60% CD-2000 (manufactured by FUJIFILM Arch Co., Ltd.). Next, the coating layer was rinsed with flowing water for 20 seconds and then dried by spraying to obtain a pattern image. Formation of the pattern image was confirmed by an optical microscope and SEM photograph observation.

6) Evaluation

The pattern image formed as described above (an image made of the colorant-containing curable composition) was subjected to the following evaluations. The results of the evaluations are shown in the following Table 1.

(1) Developing Property and Layer Remaining Ratio

The non-exposed part developing property and the exposed part remaining ratio were measured by using a chromoscope MCPD-1000 (manufactured by Otsuka Electronics Co., Ltd.). The non-exposed part developing property means that the change [%] of the absorbancy of the layer before and after the development and as the value is higher, the developing property is better. The exposed part remaining ratio means the retention ratio [%] of the absorbancy of the layer before and after the development and as the value is higher, the pattern formation is better. If the values of both of the non-exposed part developing property and the exposed part remaining ratio are high, that means the pattern formability (developing property) is good.

(2) Heat Resistance

The undercoat layer-bearing substrate on which the pattern image was formed was heated at 200° C. for 1 hour by a hot plate while the substrate face being brought into contact with the hot plate and then the chromaticity change in the pattern image, that is ΔEab value, was measured by using chromaticity meter MCPD-1000 (manufactured by Otsuka Electronics Co., Ltd.). As the ΔEab value is smaller, the heat resistance is higher.

(3) Light Fastness

After light of 200,000 lux was radiated for 10 hours (equivalent to 2,000,000 lux.h) from a xenon lamp to the undercoat layer-bearing substrate on which the pattern image was formed, the chromaticity change in the pattern image, that is ΔEab value, was measured. As the ΔEab value is smaller, the light fastness is better.

Further, a second color was applied to the undercoat layer-bearing substrate on which the pattern image was formed by using the colorant-containing resist solution described in 4) of which the colorant (the azo compound) was replaced with another color colorant and the elution of the dye and color mixing at the time of application were evaluated on the basis of absorbancy alteration before and after the second color image formation.

Examples 2 to 5 and Comparative Examples 1 and 2)

Colorant-containing resist solutions were prepared in the same manner as Example 1, except the azo compound used in "4) Preparation of Colorant-Containing Resist Solution" was replaced with the azo compounds [azo compounds represented by the general formula (I)] as shown in the following Table 1, respectively and pattern images were formed and subjected to the same evaluations. Incidentally, the example compounds (2), (30), (31), and (3) as an azo compound represented by the general formula (I) were synthesized by the method according to the Synthesis 1 in which the compound (2) in the Synthesis 1 was replaced with the respectively corresponding compounds.

TABLE 1

| | Colorant (*1) | Non-exposed part developing property [%] | Exposed part remaining ratio [%] | Heat resistance ΔEab (200° C./1 h) | Light fastness ΔEab (2M lux · h) |
|---|---|---|---|---|---|
| Example 1 | Example compound (1) | 100 | 100 | 3.80 | 2.78 |
| Example 2 | Example compound (2) | 100 | 99 | 3.89 | 3.48 |

TABLE 1-continued

|  | Colorant (*1) | Non-exposed part developing property [%] | Exposed part remaining ratio [%] | Heat resistance ΔEab (200° C./1 h) | Light fastness ΔEab (2M lux · h) |
|---|---|---|---|---|---|
| Example 3 | Example compound (30) | 100 | 100 | 3.65 | 4.30 |
| Example 4 | Example compound (31) | 100 | 99 | 4.09 | 4.65 |
| Example 5 | Example compound (3) | 100 | 99 | 4.70 | 3.88 |
| Example 11 | Example compound (1) | 100 | 100 | 3.87 | 3.12 |
| Example 12 | Example compound (1) | 100 | 97 | 3.53 | 2.91 |
| Comparative Example 1 | Acid Red 42 | 100 | 26 | 18.43 | 15.32 |
| Comparative Example 2 | Acid Yellow 42 | 52 | 63 | 13.71 | 35.55 |

(*1) Example compounds in the colorant column are azo compounds represented by the general formula (I).

As shown in Table 1, with respect to the performances in Table 1, which have conventionally been hard to be satisfactory all together, Examples of the invention using the colorant-containing curable compositions containing the azo compounds represented by the general formula (I) as colorants were found excellent in the heat resistance and light fastness and having high nonexposed part developing property and exposed part remaining ratio (exposed part curability) and thus having high developing property (pattern formability) and gave pattern images with high resolution. At the same time, even if being brought into contact with solvents, the formed patterns were not deteriorated in shapes and hues and showed excellent solvent resistance.

(Examples 6 to 10)

Pattern images were obtained by carrying out same steps as those of Examples 1 to 5, except silicon wafer substrates were used in place of the glass substrate used in Examples 1 to 5. Similar results of heat resistance and light fastness as well as nonexposed part developing property and exposed part remaining ratio were obtained as those in Examples 1 to 5.

In Examples 6 to 10, differing from the substrate in Examples 1 to 5, silicon wafer substrates were used, however the colorant-containing curable compositions were applied to the undercoat layers in all cases of Examples 1 to 10 and therefore, no specific difference was caused and similar performances were obtained.

(Examples 11 and 12)

Colorant-containing curable compositions were prepared in the same manner as Example 1, except that TAZ-107 (manufactured by Midori Kagaku Co., Ltd.) and 2-benzyl-2-dimethylamino-4-morpholinobutyrophenone were used, respectively, in place of the photopolymerization initiator used in "2) Preparation of Resist Solution" and pattern images were formed and subjected to the same evaluations. The evaluation results are shown in Table 1.

[Effects of the Invention]

The invention provides an azo compound excellent in light fastness and heat resistance as well as solubility in water and an organic solvent.

The invention provides a colorant-containing curable composition having high sensitivity and wide development latitude, excellent especially in light fastness and heat resistance as well as pattern formability (developing property), scarcely causing elution of a dye after curing, highly solvent resistant, and capable of forming pattern images (e.g. pixels) with high resolution.

The invention provides a color filter excellent especially in light fastness and heat resistance as well as solvent resistance and having high transmittance, high resolution, and high productivity from the above-mentioned colorant-containing curable composition The invention provides a color filter production method for producing a color filter which has good pattern formability (developing property) for forming pattern images with good developing property, good hues and high resolution with suppressed elution and contamination (color contamination) of colorants and which is excellent especially in light fastness and heat resistance as well as solvent resistance at a high cost performance (at a high efficiency and high productivity) by using the above-mentioned colorant-containing curable composition.

What is claimed is:

1. An azo compound represented by the following general formula (I):

General formula (I)

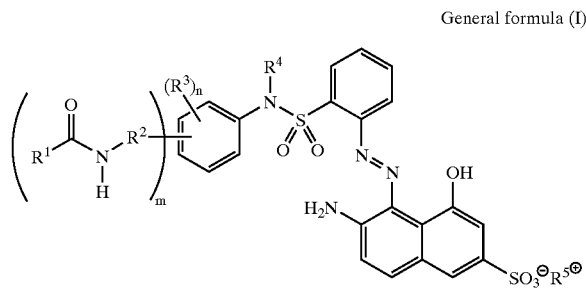

wherein $R^1$ represents a $C_{1-21}$ alkyl, a $C_{1-10}$ perfluoroalkyl, a $C_{2-21}$ alkenyl, a $C_{1-21}$ aryl, a $C_{1-21}$ aralkyl, a $C_{1-21}$ alkylamino, a $C_{1-21}$ aralkylamino, a $C_{1-21}$ arylamino, methacryloylamino, or ethoxycarbonylamino; $R^2$ represents a single bond, —$CH_2$—, —$CH_2CH_2$—, —$CH_2CH_2CH_2$— or —$CH_2CH_2CH_2CH_2$—; $R^3$ represents hydrogen, a $C_{1-21}$ alkyl, a halogen, a hydroxyl, or a $C_{1-21}$ alkoxy; $R^4$ represents a $C_{1-21}$ alkyl, a $C_{2-21}$ alkenyl, a $C_{1-21}$ aryl, or a $C_{1-21}$ aralkyl; $R^5$ represents hydrogen, a metal cation, or a cation of a nitrogen-containing compound; m denotes 1; and n denotes an integer from 0 to 4.

2. A colorant-containing curable composition comprising: a binder and a colorant, wherein the colorant contains an azo compound represented by the following general formula (I):

General formula (I)

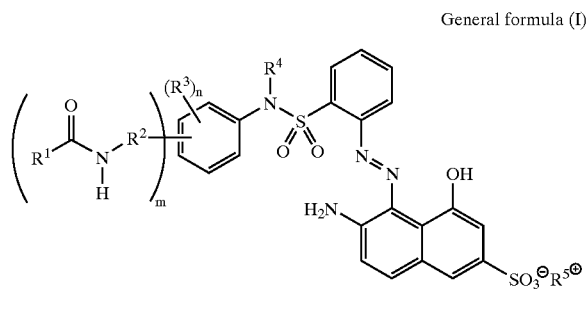

wherein $R^1$ represents a $C_{1-21}$ alkyl, a $C_{1-10}$ perfluoroalkyl, a $C_{2-21}$ alkenyl, a $C_{1-21}$ aryl, a $C_{1-21}$ aralkyl, a $C_{1-21}$ alkylamino, a $C_{1-21}$ aralkylamino, a $C_{1-21}$ arylamino, methacryloylamino, or ethoxycarbonylamino; $R^2$ represents a single bond, —$CH_2$—, —$CH_2CH_2$—, —$CH_2CH_2CH_2$—, or —$CH_2CH_2CH_2CH_2$—; $R^3$ represents hydrogen, a $C_{1-21}$ alkyl, a halogen, a hydroxyl, or a $C_{1-21}$ alkoxy; $R^4$ represents hydrogen, a $C_{1-21}$ alkyl, a $C_{2-21}$ alkenyl, a $C_{1-21}$ aryl, or a $C_{1-21}$ aralkyl; $R^5$ represents hydrogen, a metal cation, or a cation of a nitrogen-containing compound; m denotes an integer from 0 to 2; and n denotes an integer from 0 to 4.

3. A colorant-containing curable composition according to claim 2, wherein the binder contains an alkali-soluble (meth) acrylic resin.

4. A colorant-containing curable composition according to claim 2, wherein the binder contains an alkali-soluble (meth) acrylic resin having a polymerizable side chain.

5. A colorant-containing curable composition according to claim 2, further comprising a (meth)acrylic ester type polymerizable compound.

6. A colorant-containing curable composition according to claim 5, wherein the polymerizable compound contains a tetra- or higher functional (meth)acrylic ester type monomer.

7. A colorant-containing curable composition according to claim 2, further comprising a photopolymerization initiator.

8. A colorant-containing curable composition according to claim 7, wherein the photopolymerization initiator contains at least one compound selected from the group consisting of trihalomethyltriazine compounds, benzyl dimethyl ketal compounds, α-hydroxyketone compounds, α-aminoketone compounds, phosphine oxide compounds, metallocene compounds, oxime compounds, triallylimidazole dimers, benzothiazole type compounds, benzophenone compounds, acetophenone compounds and derivatives thereof, cyclopentadiene-benzene-iron complexes and salts thereof, halomethyloxadiazole compounds, and 3-aryl-substituted cumarin compounds.

9. A colorant-containing curable composition according to claim 7, wherein the photopolymerization initiator contains at least one compound that generates no acid due to decomposition.

10. A colorant-containing curable composition according to claim 7, wherein the photopolymerization initiator contains at least one compound selected from the group consisting of α-aminoketone compounds, phosphine oxide compounds, metallocene compounds, oxime compounds, and triallylimidazole dimers.

11. A colorant-containing curable composition according to claim 2, further comprising a cross-linking agent.

12. A color filter comprising a colorant-containing curable composition comprising: a binder and a colorant, wherein the colorant contains an azo compound represented by the following general formula (I):

General formula (I)

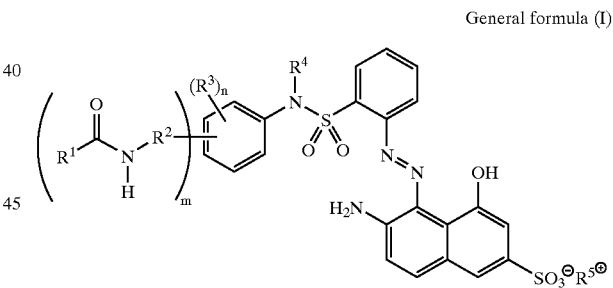

wherein $R^1$ represents a $C_{1-21}$ alkyl, a $C_{1-10}$ perfluoroalkyl, a $C_{2-21}$ alkenyl, a $C_{1-21}$ aryl, a $C_{1-21}$ aralkyl, a $C_{1-21}$ alkylamino, a $C_{1-21}$ aralkylamino, a $C_{1-21}$ arylamino, methacryloylamino, or ethoxycarbonylamino; $R^2$ represents a single bond, —$CH_2$—, —$CH_2CH_2$—, —$CH_2CH_2CH_2$—, or —$CH_2CH_2CH_2CH_2$—; $R^3$ represents hydrogen, a $C_{1-21}$ alkyl, a halogen, a hydroxyl, or a $C_{1-21}$ alkoxy; $R^4$ represents hydrogen, a $C_{1-21}$ alkyl, a $C_{2-21}$ alkenyl, a $C_{1-21}$ aryl, or a $C_{1-21}$ aralkyl; $R^5$ represents hydrogen, a metal cation, or a cation of a nitrogen-containing compound; m denotes an integer from 0 to 2; and n denotes an integer from 0 to 4.

13. A color filter according to claim 12, wherein the binder contains an alkali-soluble (meth)acrylic resin.

14. A color filter according to claim 12, wherein the binder contains an alkali-soluble (meth)acrylic resin having a polymerizable side chain.

15. A color filter according to claim 12, wherein the colorant-containing curable composition further comprises a (meth)acrylic ester type polymerizable compound.

16. A color filter according to claim 15, wherein the polymerizable compound contains a tetra- or higher functional (meth)acrylic ester type monomer.

17. A color filter production method comprising:
providing a colorant-containing curable composition that includes a binder and a colorant, wherein the colorant includes an azo compound represented by the following general formula (I),
applying the composition to a support;
exposing the composition through a mask; and
developing the exposed composition to form a pattern image, General formula (I)

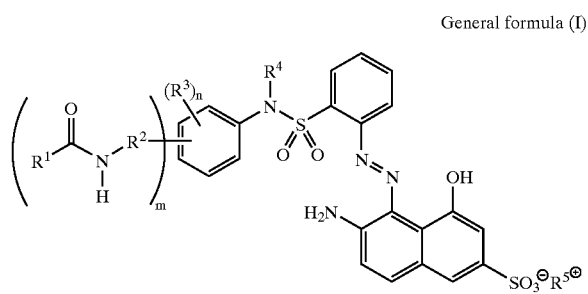

wherein, $R^1$ represents a $C_{1-21}$ alkyl, a $C_{1-10}$ perfluoroalkyl, a $C_{2-21}$ alkenyl, a $C_{1-21}$ aryl, a $C_{1-21}$ aralkyl, a $C_{1-21}$ alkylamino, a $C_{1-21}$ aralkylamino, a $C_{1-21}$ arylamino, methacryloylamino, or ethoxycarbonylamino; $R^2$ represents a single bond, $-CH_2-$, $-CH_2CH_2-$, $-CH_2CH_2CH_2-$, or $-CH_2CH_2CH_2CH_2-$; $R^3$ represents hydrogen, a $C_{1-21}$ alkyl, a halogen, a hydroxyl, or a $C_{1-21}$ alkoxy; $R^4$ represents hydrogen, a $C_{1-21}$ alkyl, a $C_{2-21}$ alkenyl, a $C_{1-21}$ aryl, or a $C_{1-21}$ aralkyl; $R^5$ represents hydrogen, a metal cation, or a cation of a nitrogen-containing compound; m denotes an integer from 0 to 2; and n denotes an integer from 0 to 4.

18. The method according to claim 17, wherein the colorant-containing curable composition further comprises a photopolymerization initiator.

19. The method according to claim 18, wherein the photopolymerization initiator contains at least one compound selected from the group consisting of trihalomethyl-triazine compounds, benzyl dimethyl ketal compounds, α-hydroxyketone compounds, α-aminoketone compounds, phosphine oxide compounds, metallocene compounds, oxime compounds, triallylimidazole dimers, benzothiazole type compounds, benzophenone compounds, acetophenone compounds and derivatives thereof, cyclopentadiene-benzene-iron complexes and salts thereof, halomethyloxadiazole compounds, and 3-aryl-substituted cumarin compounds.

20. The method according to claim 18, wherein the photopolymerization initiator contains at least one compound that generates no acid due to decomposition.

* * * * *